United States Patent
Chen

(10) Patent No.: US 9,516,378 B1
(45) Date of Patent: Dec. 6, 2016

(54) SYSTEM AND METHOD FOR DETECTING AND MONITORING ADVERTISEMENTS IN BROADCASTED MEDIA

(71) Applicant: Itay Shlomo Chen, Raanana (IL)

(72) Inventor: Itay Shlomo Chen, Raanana (IL)

(73) Assignee: ICHEN LTD, Raanana (IL)

( * ) Notice: Subject to any disclaimer, the term of this patent is extended or adjusted under 35 U.S.C. 154(b) by 0 days.

(21) Appl. No.: 14/975,923

(22) Filed: Dec. 21, 2015

(30) Foreign Application Priority Data

Dec. 17, 2015 (IL) .......................................... 243187

(51) Int. Cl.
| | |
|---|---|
| H04H 60/33 | (2008.01) |
| H04N 21/44 | (2011.01) |
| H04N 21/442 | (2011.01) |
| H04N 21/488 | (2011.01) |
| H04N 21/482 | (2011.01) |
| H04N 21/81 | (2011.01) |

(52) U.S. Cl.
CPC .. *H04N 21/44008* (2013.01); *H04N 21/44222* (2013.01); *H04N 21/4825* (2013.01); *H04N 21/4882* (2013.01); *H04N 21/812* (2013.01)

(58) Field of Classification Search
CPC .................................................. H04N 21/812
See application file for complete search history.

(56) References Cited

U.S. PATENT DOCUMENTS

| | | | | |
|---|---|---|---|---|
| 2007/0008956 A1* | 1/2007 | Moran | ................... | H04H 20/82 370/352 |
| 2008/0059055 A1* | 3/2008 | Geelen | ................... | G01C 21/32 701/533 |
| 2011/0093783 A1* | 4/2011 | Parra | ...................... | G06Q 30/02 715/719 |
| 2013/0347035 A1* | 12/2013 | Tang | ................... | H04N 21/482 725/38 |

\* cited by examiner

*Primary Examiner* — Gigi L Dubasky
(74) *Attorney, Agent, or Firm* — Soroker Agmon Nordman

(57) ABSTRACT

A method for detecting and monitoring advertisements in broadcasted media comprising providing an application to a user for installation on a user's computerized apparatus, determining a channel of a broadcasted medium currently selected by the user, monitoring the selected channel for presence of advertisements, determining presence of at least one advertisement, generating, in real time, an alert to the user regarding the presence and/or absence of advertisements, based on the determined presence of at least one advertisement, and the alert causing the application to display on the user's computerized apparatus a list of monitored channels along with indications regarding the presence or absence of advertisements in the listed channels, and a system for performing the same.

14 Claims, 10 Drawing Sheets

SYSTEM AND METHOD FOR DETECTING AND MONITORING ADVERTISEMENTS IN BROADCASTED MEDIA

FIELD OF THE INVENTION

The present disclosure generally relates to detection of advertisements in broadcasted media, and more specifically to real-time detection and monitoring of advertisements in broadcasted media.

BACKGROUND

Attempts for detection of advertisements or commercials in broadcasted media are known in the art. For example, U.S. Pat. No. 7,272,295, discloses a method and apparatus for controlling an MPEG video media recording device to automatically identify and selectively skip segments of a video signal, such as commercial advertisements, during a recording session. One drawback of this method is that no solution for detecting advertisements in live broadcasted media, (in real-time) is suggested. Another example is U.S. Pat. No. 6,701,355, which describes a system and method for substituting one advertisement segment with a second advertisement segment in order to increase potential revenues generated for advertisement spots in radio broadcasting. According to this method, an insertion and encoder system monitors broadcasts from a first broadcasting system to determine the presence of segments that can be substituted in a second broadcast. However, this method does not provide a solution for a user who wishes to avoid advertisements substantially entirely, since it discloses a system and method for replacing one advertisement with another.

There is therefore a need for a system and method that enable continuous detection and monitoring of presence of advertisements in broadcasted media, in real-time, which allow the user of the live broadcasted media to avoid listening to or watching advertisements.

SUMMARY

One exemplary embodiment of the disclosed subject matter is a method comprising determining a channel of a broadcasted medium currently selected by a user, monitoring the selected channel for presence of advertisements, and determining presence of at least one advertisement. In response to determining presence of at least one advertisement, generating, in real time, an alert to the user regarding the presence and/or absence of advertisements, and the alert causing the application to display on the user's computerized apparatus one channel or a list of monitored channels along with indications regarding the presence and/or absence of advertisements in the listed channels.

Another exemplary embodiment of the disclosed subject matter is a system comprising a processing unit configured to determine a channel of a broadcasted medium currently selected by a user, monitor the selected channel for presence of advertisements, and determine presence of at least one advertisement. In response to determining presence of at least one advertisement, the processing unit generates, in real time, an alert to the user regarding the presence and/or absence of advertisements. The system further comprises a display unit to provide the alert to the user in a selected display method, e.g. an auditory and/or visual manner.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1A:
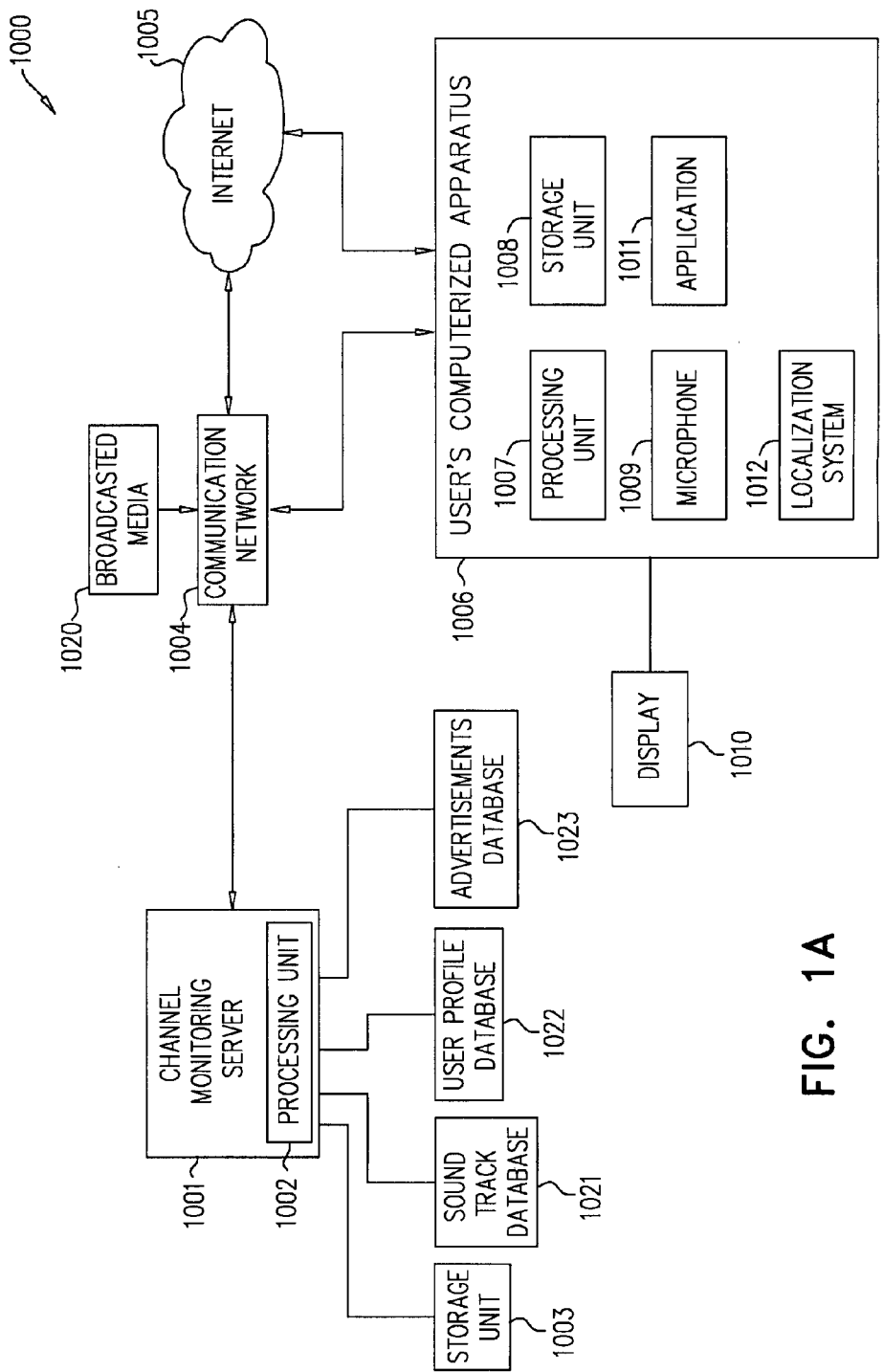

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 1B:
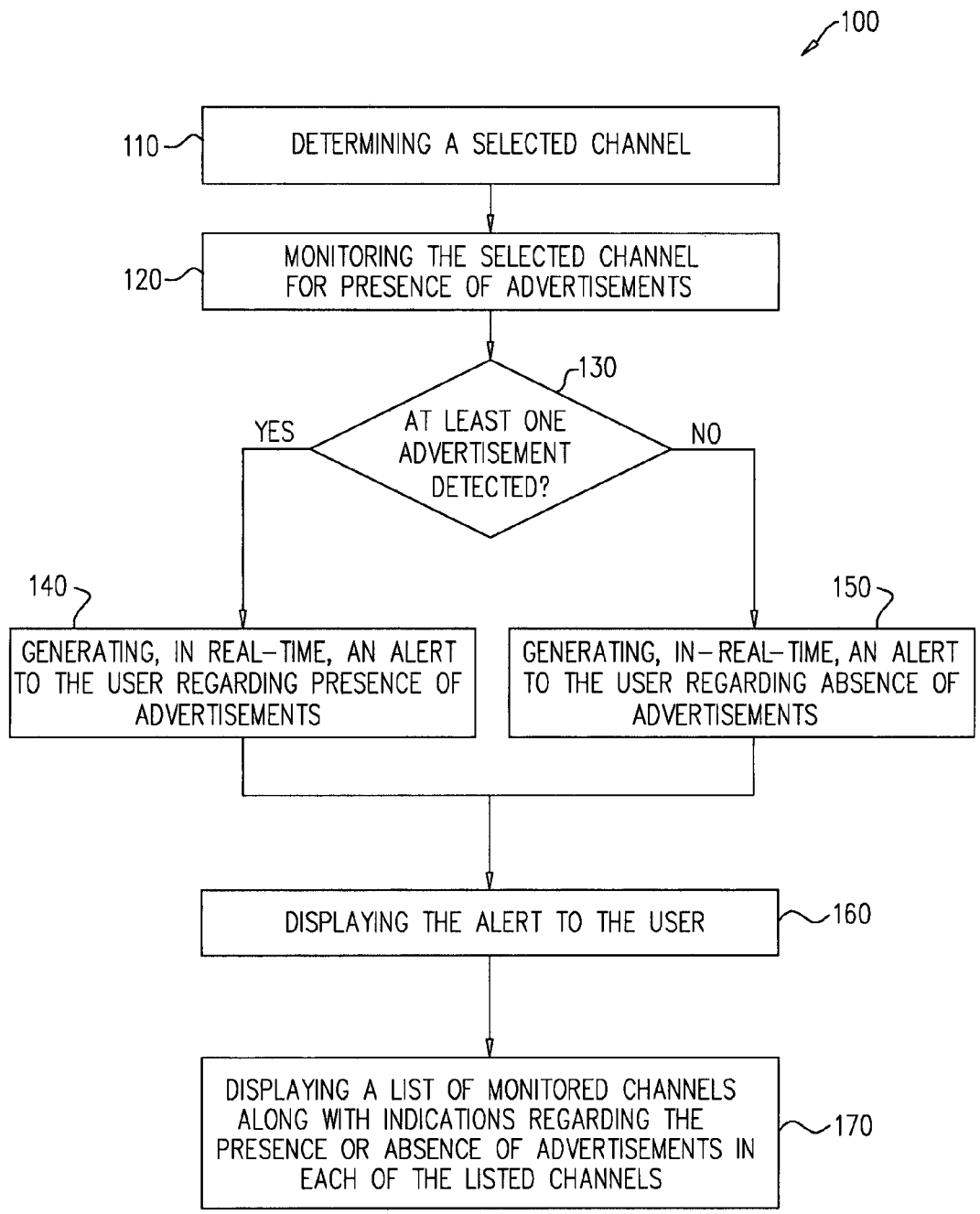
Figure 2:
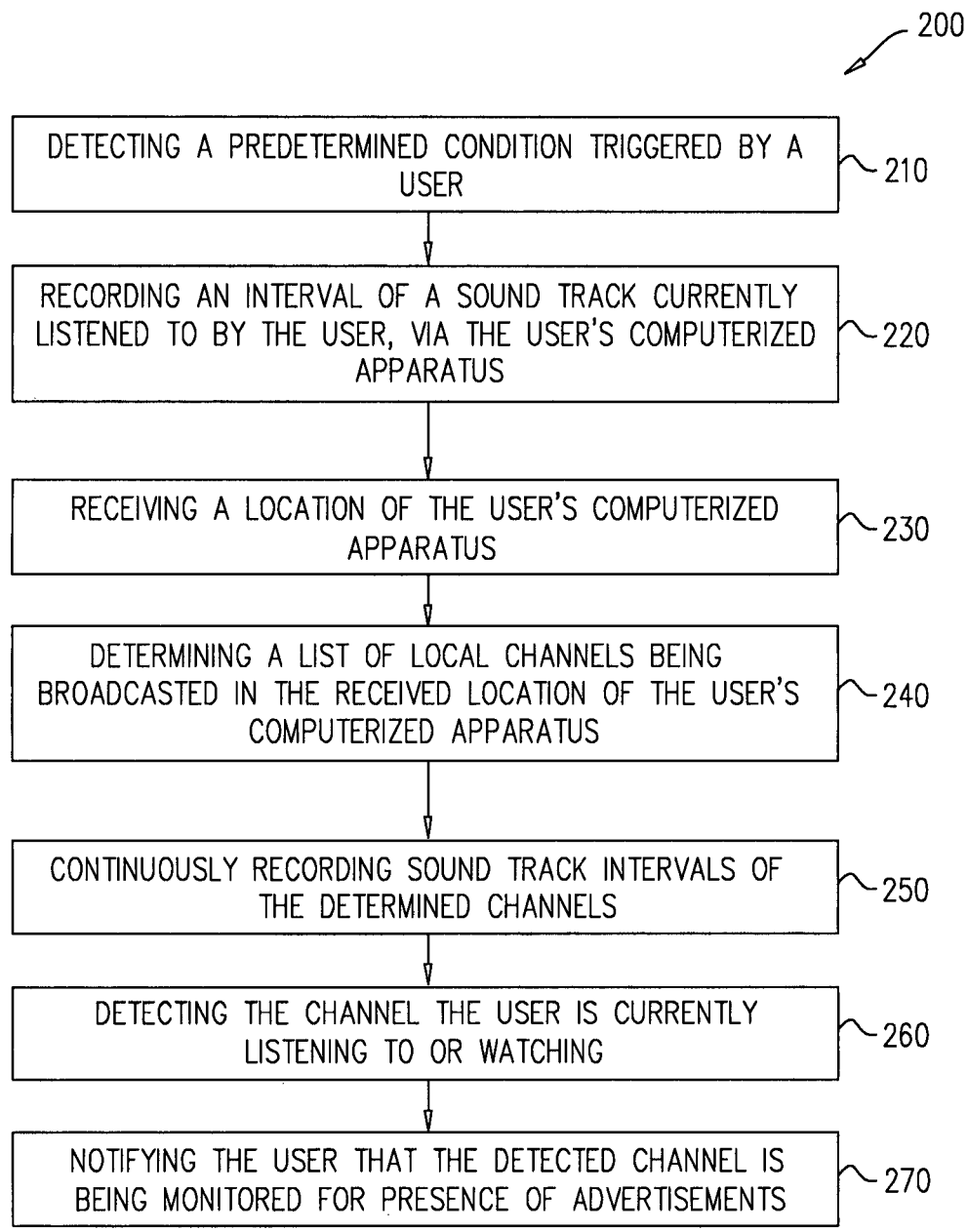
Figure 3:
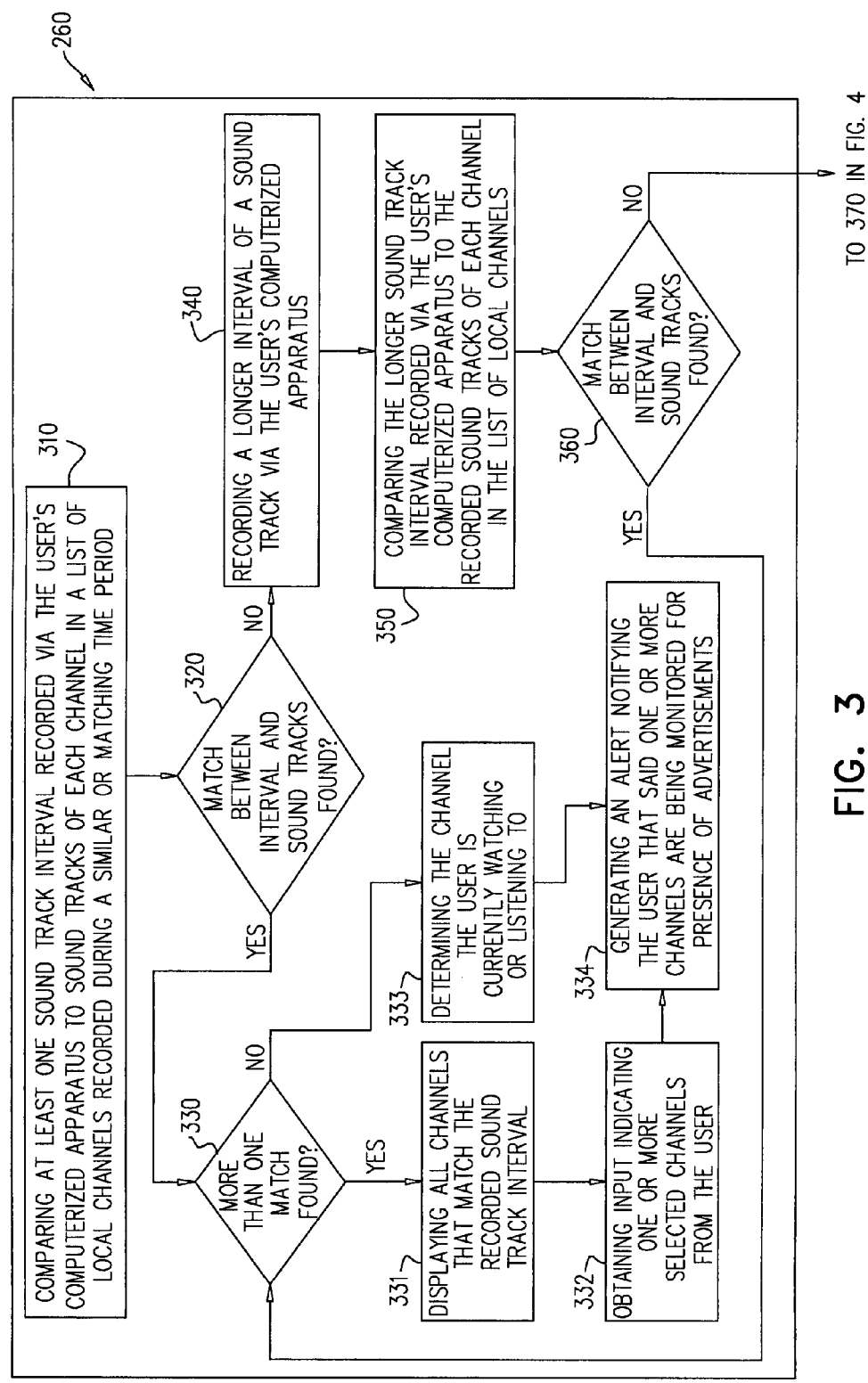
Figure 4:
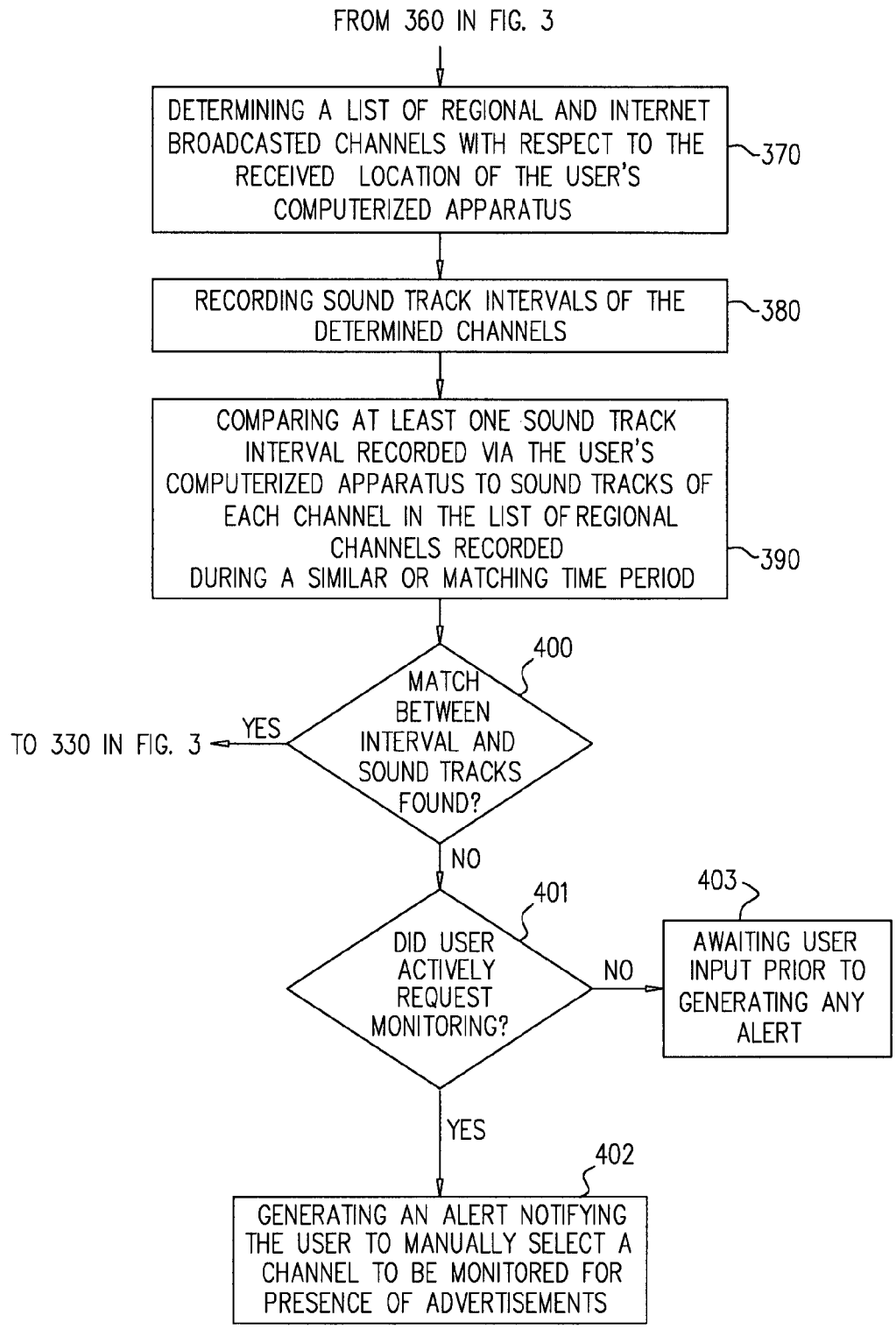
Figure 5:
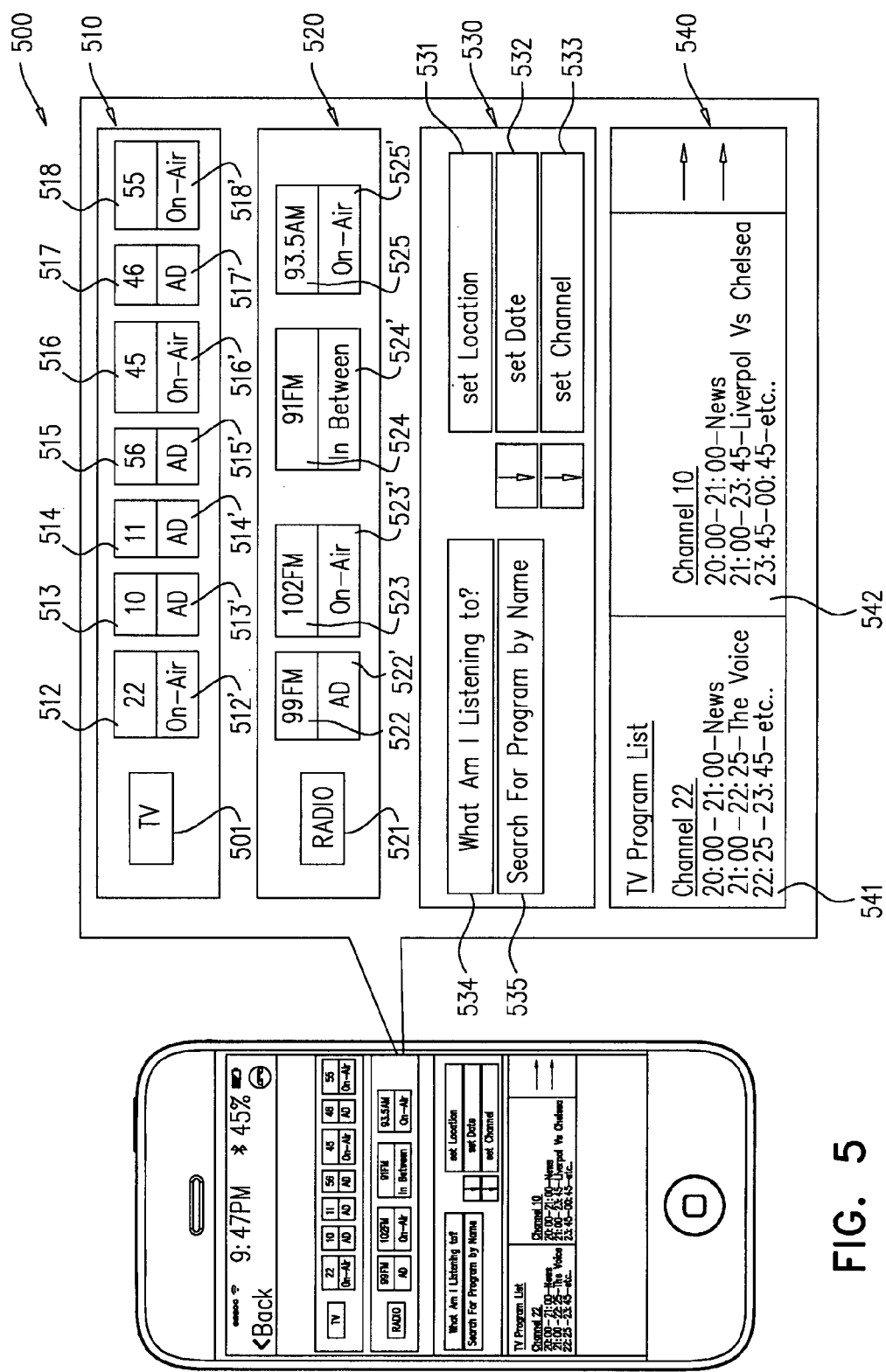
Figure 6:
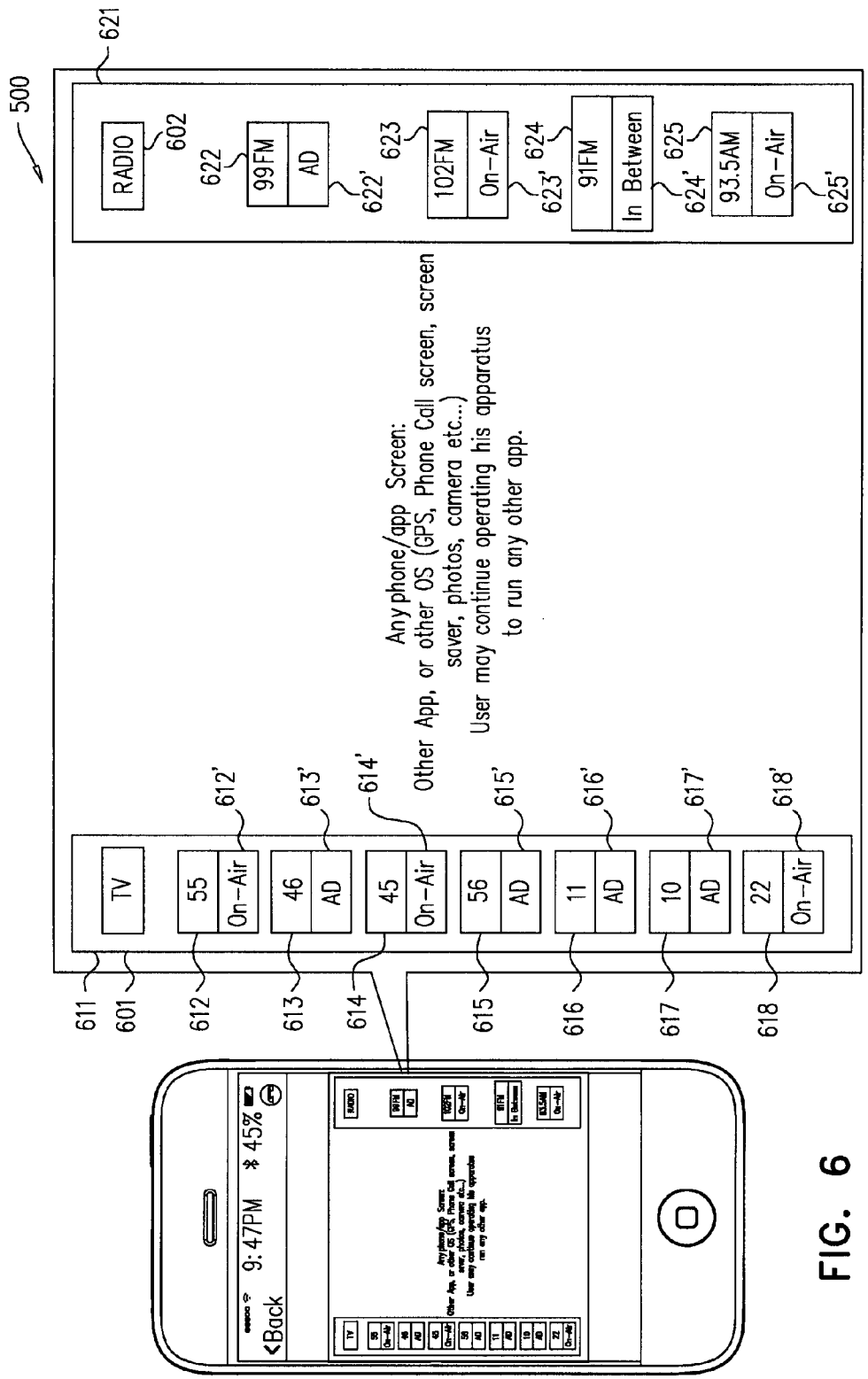
Figure 7:
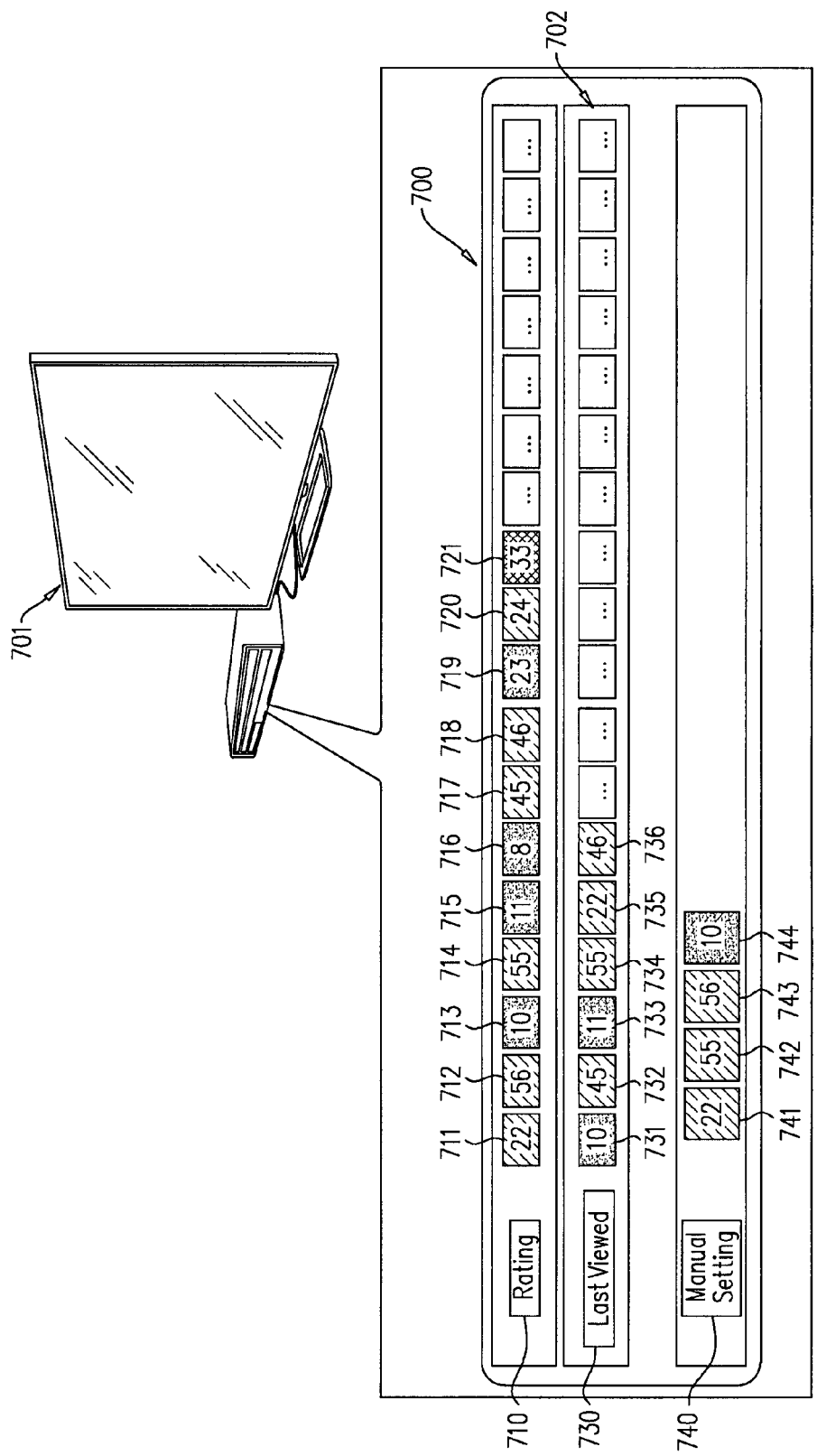
Figure 8:
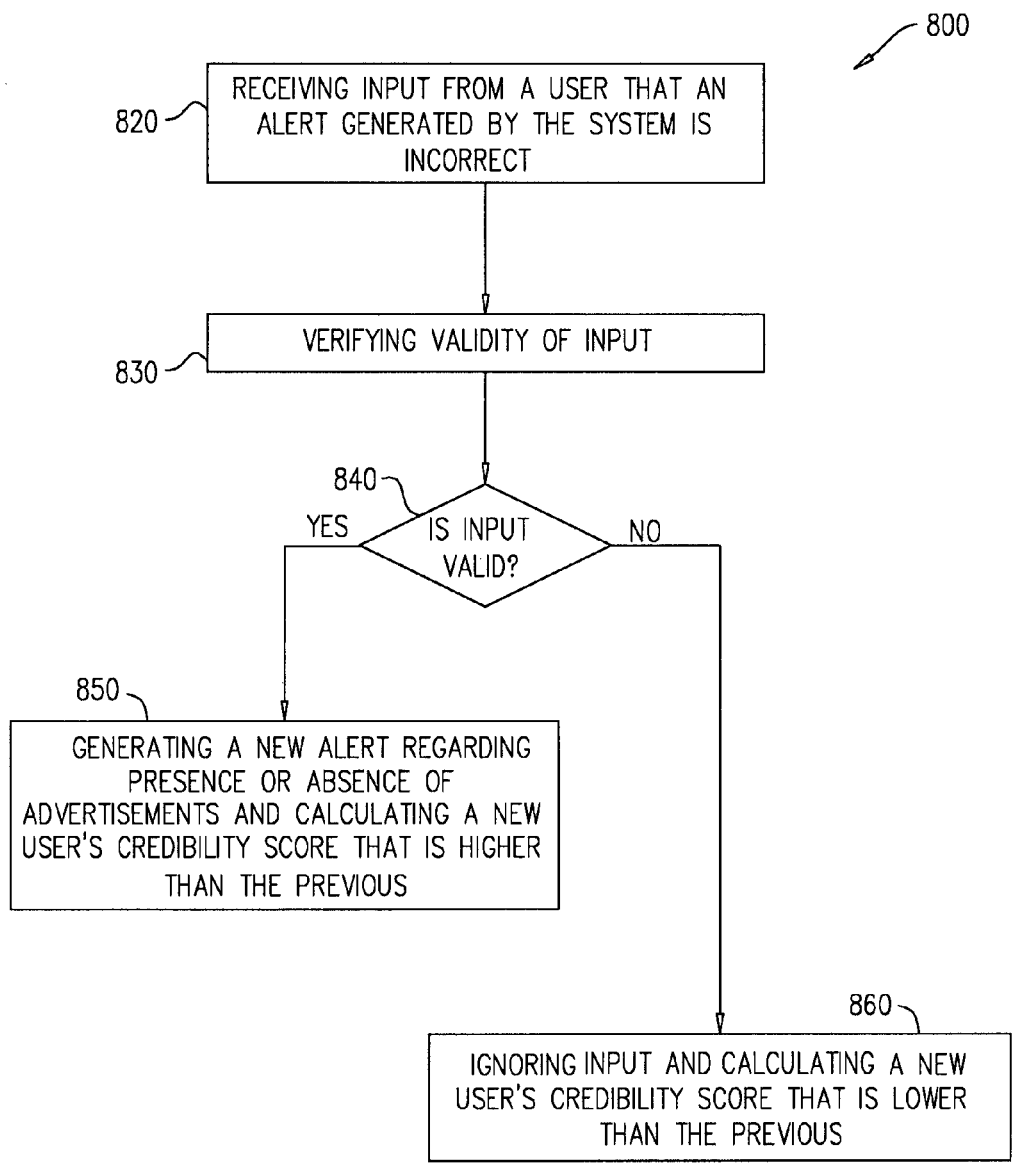
Figure 9:
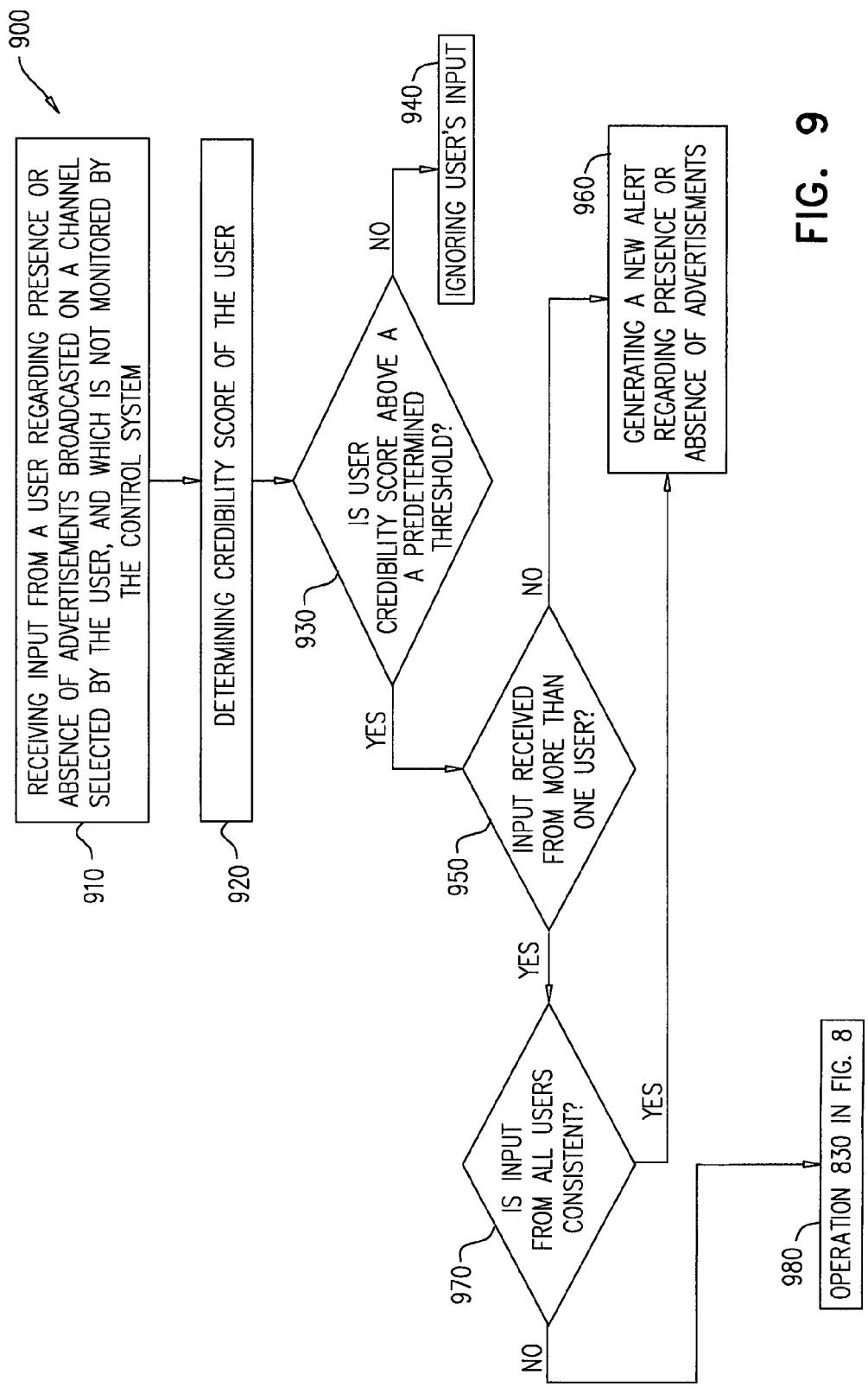

FIG. 1A is a schematic diagram of a system for monitoring channels for presence of advertisements, according to exemplary embodiments of the disclosed subject matter;

FIG. 1B is a flowchart of a method for monitoring a selected channel for presence of advertisements, according to exemplary embodiments of the disclosed subject matter;

FIG. 2 is a flowchart of a method for detection of a channel the user is currently listening to or watching, and monitoring the channel for presence of advertisements, according to exemplary embodiments of the disclosed subject matter;

FIGS. 3-4 are flowcharts of a method for detection of a channel the user is currently listening to or watching, according to exemplary embodiments of the disclosed subject matter;

FIG. 5 schematically illustrates a display of a Graphic User Interface (GUI) of a system for detecting and monitoring advertisements in broadcasted media, according to exemplary embodiments of the disclosed subject matter;

FIG. 6 schematically illustrates a display of a Graphic User Interface of a system for monitoring advertisements in broadcasted media, according to exemplary embodiments of the disclosed subject matter;

FIG. 7 schematically illustrates a display of a Graphic User Interface on a device for monitoring advertisements on TV, according to exemplary embodiments of the disclosed subject matter;

FIG. 8 is a flowchart of a method for 'social monitoring' of broadcasted media for presence of advertisements, according to exemplary embodiments of the disclosed subject matter; and FIG. 9 is a flowchart of a method for 'social monitoring' of broadcasted media for presence of advertisements, according to exemplary embodiments of the disclosed subject matter.

DETAILED DESCRIPTION

In the context of the present disclosure, without limiting, the term 'broadcasted media' relates to distribution of audio and/or video content to a dispersed audience via any electronic mass communications medium, such as television, radio, and satellite radio (or internet radio), which are all collective communication outlets or tools that are used to store and deliver information or data. In the context of the present disclosure, without limiting, the term 'broadcasted medium' relates to any of the listed broadcasted media, e.g., TV, radio, internet TV or internet radio.

For brevity and unless otherwise specified or evident from the context, a television is referred to also as a TV.

In the context of the present invention, without limiting, the term 'channel' or 'station' relate to a physical or virtual channel over which broadcasted content is distributed. The channel may be indicated by an identifier (e.g., an identifying number ASCII string for example 'channel 4') or may be referred to by a name, e.g., 'BBC' channel.

In the context of the present disclosure, without limiting, the term 'program' relates to a segment of content intended for broadcast either on TV, internet TV, radio or satellite radio, wherein a list of programs broadcasted from the beginning of a broadcasting day until the end of the broadcasting day define the entire broadcasting schedule for the channel of the medium it is broadcasted on.

In the context of the present disclosure, without limiting, the term 'advertisement' relates to a segment of content containing commercial related information, or information on future programs of any broadcasted medium. Advertisements appear between and/or during broadcasted programs, and are distinctively not part of the broadcasted programs.

In the context of the present invention, without limiting, the term 'indicator' relates to a graphical indication such as a button, a box, a list, a chart, or any other graphical indication of the sort, which is visually displayed on the Graphic User Interface (GUI) of the system.

The terms cited above denote also inflections and conjugates thereof.

Nowadays, advertising, typically commercial advertising, has become an integral part of broadcasted content in any broadcasted media. Substantially, every program in any of the broadcasted media, is interrupted at least once for broadcast of at least one advertisement. This method of broadcasting advertisements during and between programs has proven to increase consumption of the products or services that are advertised. However, a user of broadcasted media may be frustrated by such constant interruption of a program he is listening to or watching.

The purpose of the present disclosure is to provide a system and method for detecting and monitoring a channel and/or program the user is listening to or watching, and for notifying the user, in real-time, when the channel and/or program is interrupted for broadcasting of advertisements, and when the channel or program are back on-air, after the session of advertisements has ended. This enables the user to be free to decide how he would like to spend his time during an advertisements session, as well as to know when he can return to listen to or watch the channel or program he was listening to or watching prior to the beginning of the advertisements session.

The present disclosure further provides simultaneous monitoring, in real-time, of a plurality of channels (and/or programs), which enables the user to switch between channels (or programs) during any advertisement session and to avoid missing out on broadcasting of his channel (or program) of choice, once an advertisement session has ended. That is, a number of channels, for example, channels A-D are monitored by the system, e.g., constantly monitored, in real-time or substantially real time or quasi real time. When the user is listening to or watching channel A, and at least one advertisement is broadcasted in channel A and thus detected by the system, the system notifies the user of presence of advertisements, during which the user may switch to any of channels B-D, according to which of these channels is shown by the system to be on-air and not broadcasting advertisements as well. When the system detects that the advertisements in channel A has ended, the system notifies the user that channel A is back on-air, thus enabling the user to switch back to channel A, if he so desires. Furthermore, notification to the user that a channel is back on-air, may prevent the user from missing out on segments of broadcast of that channel once an advertisement session had ended.

In some embodiments, the system may determine and suggest to the user other channels that are currently broadcasting a program rather than an advertisement session. In another example, the list of suggested channels may be according to a user's preferences, history of watched TV shows, a rating score, or other preferences which may be learned from the user's habits or provided by the user. In some embodiments, the system may indicate that one or more of the monitored channels may be starting an advertisement session within a few minutes.

A general non-limiting presentation of practicing the present disclosure is given below, outlining exemplary practice of embodiments of the present disclosure and providing a constructive basis for variant and/or alternative embodiments, some of which are subsequently described.

FIG. 1A is a schematic diagram of a system 1000 for monitoring channels for presence of advertisements, according to exemplary embodiments of the disclosed subject matter.

System 1000 may comprise a channel monitoring server 1001 for monitoring channels of broadcasted media for presence and/or absence of advertisements. Channel monitoring server 1001 may comprise a processing unit 1002, configured to execute code or software instructions to carry out embodiments of the present invention. The code may be stored, for example, in a storage unit or memory 1003, which may be included in and/or communicate with, for example, channel monitoring server 1001. Storage unit 1003 may store information regarding broadcasted media with respect to a user's or users' preferences of listening and/or viewing habits.

Channel monitoring server 1001 may be configured to monitor, in real time a channel or channels of broadcasted media the user is listening to or watching, or has requested to monitor. Channel monitoring server 1001 may further monitor the broadcasted media for presence of advertisements, determine the presence of at least one advertisement, and generate, in real-time, an alert to the user regarding presence and/or absence of advertisements in the broadcasted media.

In some embodiments, channel monitoring server 1001 may comprise a distributed architecture, such that instead of one channel monitoring server 1001, system 1000 may comprise multiple distributed servers, wherein each of the distributed servers may be dedicated to monitor one or more respective channels of broadcasted media.

In some embodiments, channel monitoring server 1001 may be operationally connected to internet 1005, either directly or via communication network 1004. Communication between channel monitoring server 1001 and internet 1005, and/or between communication network 1004 and internet 1005, may be acquired in a wired or wireless manner, e.g., through LAN, WAN, WIFI, Bluetooth, wireless LAN, cellular network, etc. Broadcasted media content may be provided via a receiver that obtains the broadcasted content, and/or may also be connected to internet 1005, either directly or via communication network 1004. Thus, broadcasted media content may be provided to channel monitoring server 1001 through communication network 1004, or directly through internet 1005.

According to some embodiments, system 1000 may further comprise a user's computerized apparatus 1006. The user's computerized apparatus 1006 may be a mobile device or mobile phone, a desktop computer, a tablet, a workstation, or another dedicated computerized device, etc. User's computerized apparatus 1006 may comprise a processing unit 1007 and a storage unit 1008. Processing unit 1007 may be configured to install and run/operate an executable application 1011 for detecting and monitoring advertisements in broadcasted media on the user's computerized apparatus 1006. Storage unit 1008 may store data required for operation of the executable application 1011, or data generated by the executable application 1011. Processing unit 1007 may be configured to cause to display monitoring data related to one or more channels being monitored for the presence and/or absence of advertisements, according to settings provided by the user.

User's computerized apparatus 1006 may communicate with channel monitoring server 1001 through the internet 1005 or through communication network 1004, via wireless communication, e.g., LAN, WAN, WIFI, Bluetooth, cellular network, etc.

In some embodiments, user's computerized apparatus 1006 may further comprise a microphone 1009, which may be activated by processing unit 1007, in order to obtain sound track intervals which are used by channel monitoring server 1001 to detect a channel of broadcasted media that the user may be listening to or watching, as explained in detail with respect to FIGS. 2-4.

In some embodiments, user's computerized apparatus 1006 may comprise a localization system 1012, which may detect and provide information on the location of user's computerized apparatus 1006. For example, localization system 1012 may comprise a Global Positioning System (GPS).

According to some embodiments, system 1000 may comprise a display unit 1010. Display unit 1010 may either be incorporated within user's computerized device 1006, or may be a separate, dedicated device which may communicate with user's computerized device 1006 through wireless communication, e.g., LAN, WAN, WIFI, Bluetooth, etc. Display 1010 may be used to display, in real time, alerts to the user regarding presence and/or absence of advertisements in broadcasted media, specifically, in one or more selected channel/s, as well as display a list of monitored channels along with indications regarding the presence and/or absence of advertisements in each of the listed channels. Display unit 1010 may comprise a visual display, e.g., a screen and/or an auditory display, e.g., speakers, or other tactile alerting mechanisms such as vibratory alerts.

In some embodiments, user application 1011, which is an executable application for monitoring broadcasted media for presence or absence of advertisements, may be downloaded to and/or installed on user's computerized apparatus 1006. Application 1011 may be executable by processing unit 1007, and may be configured to obtain data from a user, relating to the user's profile, user's preferences, user's device, user's viewing or listening habits, user's typical content consumption time periods, error reports provided by a user, etc.

Application 1011 may further be configured to obtain user-related or user-defined data, and to store the data in storage unit 1008 and/or to provide it to channel monitoring server 1001, e.g., per the user's viewing and listening habits and preferences, application settings, or error reports that the user may provide. Application 1011 may cause activation of microphone 1009 in order to obtain sound data, e.g., an interval of a sound track that is recorded by microphone 1009.

Channel monitoring server 1001 is configured to obtain recorded sound track intervals from a user. Channel monitoring server 1001 may include or may be in communication with a graphic user interface to receive indications from one or more persons monitoring the channels, to determine whether the current broadcasted content includes advertisements or not.

Channel monitoring server 1001 is configured to continuously record sound tracks of broadcasted content, and to store at least a predetermined period of time of the recording in a sound track database 1021, e.g., at least a period of one hour's content may be stored for each monitored channel. The content is continuously updated and the earlier recorded sound track may be deleted or archived. The recorded sound tracks are stored with a corresponding time stamp per recording, and the time stamp is used to determine which recorded sound track should be compared to the user's sound track interval (recorded via microphone 1009) in order to determine the user's selected channel.

The recorded sound tracks are used to compare the sound track intervals obtained from the user (via microphone 1009) to a corresponding time period of stored sound track in order to determine a channel that the user is currently watching or listening to.

Channel monitoring server 1001 is configured to obtain data related to a user and to store the data per user in a user profile database 1022. User profile database 1022 may store, for example, the following parameters for each user: a list of channels most frequently viewed or listened to by the user, including channels the user has requested to be monitored by application 1011, typical viewing/listening time periods, settings for preferred display of the GUI of application 1011, accumulated viewing/listening time per channel, etc.

Channel monitoring server 1001 may be configured to obtain error reports from one or more users, and to calculate a user's credibility score based on the error report and based on other parameters such as the validity of error reports that the user provided, accumulated validity, the number of events that the user reported, etc.

Channel monitoring server 1001 may be configured to obtain data related to advertisements and to store the advertisement data in an advertisements database 1023. Advertisements database 1023 may store any advertisement that was ever broadcasted in any channel, whether TV, radio, internet TV or internet radio, and so on. Advertisements database 1023 may store information related to the advertisements, e.g. the number of times they were detected, which channel/s they are broadcasted in, etc. Channel monitoring server 1001 may constantly update advertisements database 1023, such that when, for example, a new advertisement that is not yet stored in advertisements database 1023 is detected, that new advertisement may be stored in advertisements database 1023. The data stored in advertisements database 1023 may be used to determine whether the current broadcasted content includes advertisements or not.

FIG. 1B is a flowchart of a method 100 for monitoring a selected channel for presence of advertisements, according to exemplary embodiments of the disclosed subject matter. Typically, operations 100 may be performed by a user's computerized apparatus.

In operation 110, a selected channel of a broadcasted medium, which is to be monitored, is determined. In some embodiments, the selected channel may be selected either manually by a user, or automatically by a processing unit. In some embodiments, the processing unit performs the determination of the selected channel, e.g., according to a 'channel rating score' as further explained below For example, an executable application, e.g., application 1011, may be provided, which a user may download and install, e.g., on a user's mobile device or on any other computerized apparatus (e.g., desktop computer, tablet, etc.), e.g., user's computerized apparatus 1006. The executable application may allow the user to input relevant data related to the user's broadcast data consumption habits, e.g., preferred or regularly watched programs, preferred channels, and/or typical time periods during which the user is watching or listening to broadcasted media.

The user may indicate that a specific channel or program is of interest for him/her, and may request channel monitoring for the specific channel during certain time periods (e.g., during repeated daily or weekly time periods, or during a certain time period).

In operation 120, the selected channel is being monitored for presence of advertisements. In some embodiments, the monitoring of the selected channel is performed manually, e.g., by one or more persons in a monitoring center, who may be constantly watching or listening to the broadcasted content and manually indicating in real time whether the currently displayed content is a program, an advertisement, or content that is neither a program nor an advertisement, for example, a breaking news broadcast, a status traffic announcement, a weather report, or program promotion, and so on, which is not listed as part of the broadcasting schedule. In some embodiments, the monitoring of the selected channel is performed by a processing unit, e.g., of a channel monitoring server 1001. The monitoring of the selected channel may include continuously monitoring or constantly monitoring the broadcasted content, in real time.

Monitoring channels may be performed in various methods. For example, monitoring may be done automatically, e.g., by a processor of a channel monitoring server, e.g., processing unit 1002. Automatic methods for detecting advertisements may comprise detecting a feature of the broadcasted segment that indicates an advertisement is about to be broadcasted, e.g., advertisements are often played at a higher volume than that of a program, therefore a volume increase (without a command from the user) may indicate that an advertisements is being broadcasted. In other examples, advertisements are typically broadcasted after a short "jingle" that is related to or associated with the program, channel or concessionaire of a channel currently broadcasted, and that same "jingle" is typically played again at the end of the advertisement session, prior to the returning to the broadcasted program. The jingle may be or may include a piece of verse or a short song having a catchy succession of sounds. Therefore, one or more "jingles" may be associated with a program, a channel, or a concessionaire of a channel and upon detecting that the "jingle" was broadcasted, the channel monitoring server 1001 may determine that a session of advertisements is currently being broadcasted, and upon detecting a "jingle" associated with the monitored channel again, the channel monitoring server 1001 may determine that the advertisement session has ended, and so on. Additional examples for automatic detection of advertisements on TV may include detection of scene/shot breaks, or scene changes that are more common during advertisements, so as to increase interest of the viewer. Another example may include detection of action, since advertisements may typically have more action in a short time than during a program. In some cases, dark frames may be detected in the broadcasted media by channel monitoring server 1001, which separate between the program content to advertisement content being broadcasted. One or more of these or other methods for automatic detection of advertisements may be implemented by channel monitoring server 1001.

In further examples, channel monitoring server 1001 may be configured to detect advertisements per each program, according to specific methods most relevant to that program. For example, if the monitored program is a news show or a talk show, one would expect to that during the news or talk show, the same voice (e.g., of the anchorperson or the host of the show) would be frequently heard, e.g. throughout substantially the entirety of the show, and/or that there would be little change of scene and color during such a show. Thus, channel monitoring server 1001 may be configured to focus on changes in the broadcasted sound or image, e.g. the voice, and/or color of the images displayed during such shows.

In an additional example, if the program is a broadcasted soccer game, there are typically known time periods during which the game is out for advertisements' breaks. Furthermore, typically, the dominating color in the displayed images of the game is green, due to the grass the players are playing on, and the voices heard during the game are those of, for example, the anchor and commentator. Thus, in such case, channel monitoring server 1001 may be configured to focus on changes occurring during the pre-known break time periods, on changes in scenery compared to the green color, and to changes in voices compared to those of the anchor and commentator, and so on.

In other examples, monitoring broadcasted media for presence of advertisements is manually performed by a human monitoring center. A human activated monitoring center comprises one or more persons who may be constantly and continuously listening to and/or watching, either several predetermined channels or substantially all channels of any broadcasted media. These persons monitor such channels for presence of advertisements in real-time. As soon as an advertisement is detected by anyone of the persons performing monitoring, the person who detected an advertisement immediately inputs an alert or indication to the channel monitoring server 1001 indicating that advertisements are currently broadcasted by the specific channel the person is monitoring. The alert generated by the 'monitoring person' is then transmitted by the channel monitoring server 1001 to computerized devices of all users who are listening to or watching that channel, or have requested the system to monitor that channel, in order to cause a change of display in the computerized devices of these users that indicates the channel is currently broadcasting advertisements. Once the person monitoring that channel detects that advertisements are no longer broadcasted but rather that other content is now broadcasted, that monitoring person generates a new alert indicating that advertisements are no longer broadcasted by the channel. The new alert generated by the monitoring person is then transmitted from channel monitoring server 1001 to computerized devices of all users who are listening to or watching the channel, or have requested the system to monitor that channel, in order to cause a change of display in the computerized devices of these users that indicates the channel is currently not broadcasting advertisements but is rather back on-air, i.e., broadcasting other content, e.g., a program. When advertisements are broadcasted once again, a new alert regarding presence of advertisements is generated by the monitoring person, and so on. The human monitoring center performs monitoring of broadcasted media for presence of advertisements, 24 hours per day, seven days a week, in order to provide continuous and reliable monitoring.

In some embodiments, during a certain time interval, no advertisement may be broadcasted, but no listed program (e.g., according to an expected broadcasting schedule) is broadcasted, for example, due to a breaking news report. In such case, the person monitoring the channel may generate a broadcast interruption indication or alert, indicating there is an interruption of the broadcasting schedule. Another example for a unique alert that may be generated by the system, e.g. based on a person monitoring the channel or based on other indications, may be generated when a broadcast is being interrupted or has ceased due to transmission failure. In such case, a person monitoring the channel may indicate that there are problems in broadcast, and the system may generate an alert indicating to the user that, broadcast problems were detected.

In yet other embodiments, monitoring broadcasted media for presence of advertisements may be performed by 'social monitoring', which is advanced channel monitoring based on input received from users of the application for monitoring broadcasted media for presence of advertisements, e.g., application 1011. Social monitoring is explained in detail with respect to FIGS. 8-9 hereinbelow.

In operation 130, detection of presence or absence of at least one advertisement is established. In some embodiments, this operation may be performed by a processing unit, e.g., according to any or other of the examples listed above with regards to automatic methods for detecting advertisements.

If at least one advertisement is detected in operation 130, an alert to the user regarding presence of advertisements may be generated, in real-time, in operation 140. If at least one advertisement is not detected in operation 130, an alert to the user regarding absence of advertisements may be generated, in real-time, in operation 150. In some embodiments, a processing unit may generate an alert, e.g., a processing unit of a channel monitoring server 1001. The alert may be provided to the user's computerized apparatus, e.g., sent over a wire communication channel, a wireless communication channel or cellular communication channel such as Bluetooth, RF, SMS, over an Internet connection, etc. In operation 160, an alert may be displayed to the user, e.g., by display unit 1010. The alert that may be displayed to the user may either be an alert on presence of advertisements, in case at least one advertisement was detected in operation 130, or an alert on absence of advertisements, in case at least one advertisement was not detected in operation 130. In some embodiments, the alert may be displayed by a display unit, e.g., display unit 1010. In some embodiments, the alert may be displayed to the user in an auditory or visual manner or in any combination of both. In some embodiments, when the user's computerized apparatus 1006 is a mobile phone device, the alert may further include additional features, such as vibratory indication. Is some embodiments, the user may select or configure (e.g., via the provided executable application, e.g., application 1011 installed on the user's computerized apparatus 1006) the type of alert that is displayed.

In some embodiments, additional operations may be caused by the advertisement alert. For example, the system may cause to automatically mute or decrease the volume of the broadcasted medium (e.g., the volume of the TV or the radio) upon indication that an advertisement session is broadcasted, or may display a suggested list of channels which are currently not broadcasting advertisements.

In some embodiments, in operation 170, a list of monitored channels along with indications regarding the presence or absence of advertisements in each of the listed channels, may be displayed. More than one channel may be selected in operation 110, and monitored for presence of at least one advertisement, thus such a list of monitored channels along with an indication regarding presence or absence of advertisements for each monitored channel may be displayed to the user. The list of monitored channels, along with the indications regarding presence or absence of advertisements in each of the listed channels, may be displayed by a display unit 1010, e.g., a screen, loudspeakers, etc.

According to some embodiments, an indication of the selected channel may be received by the user, in operation 110. In yet other embodiments, determining the selected channel is performed automatically by a processing unit 1002. The automatic channel determination may be performed according to a 'channel rating score'.

A channel rating score may be a score that is calculated based on historical viewing, listening or configuration data stored for a specific user. For example, each user may have his own personal rating score per channel and/or per a specific type of content (e.g., sports, comedy, reality shows, etc.), according to the user's listening or viewing habits. The historical data may be the historical data of the channel of broadcasted medium that the user listened to or watched. For example, historical data of the user may be stored on a storage unit 1003 or may be preferably stored by a user profile database 1022, which are both operationally connected to the channel monitoring server 1001. A processing unit 1002 may then process the historical data, e.g., historical channel selections by the user, and thus based on, for example, a certain time of the day, during which the user typically listens to or watches a specific channel or program, the processing unit may automatically determine to initiate monitoring of that specific channel or program.

In some embodiments, the channel rating score may be a general rating score that is calculated for a channel based on historical data of a group of users, or all users of the advertisement monitoring and alert system. The score may be normalized to a predetermined range, e.g. [0-1], [1-10] or [0-100]. For example, historical data of some or all users of the system for detecting and monitoring advertisements in broadcasted media, may be stored, e.g., in storage unit 1003, or preferably in user profile database 1022. A processing unit may then process the historical data of the users in order to determine, e.g., per one or more predetermined time periods of a day, the channel (or program) that a percentage or amount of users are listening to or watching. For example, a channel that above a certain threshold of users are listening to or watching, or that the majority of users are listening to or watching at the same time of day, would be assigned a high rating score. One or more other channels broadcasting during that same time slot would be assigned a lower rating score, e.g. corresponding or correlating to the amount or percentage of users who are watching these channels, or who indicated they would like to monitor these channels.

In some embodiments, the system may automatically determine a channel that is assigned a high rating score by substantially all users of the system, as the selected channel that is to be monitored. In other embodiments, the processing unit may generate an alert to the user (which may be displayed by a display unit) as to whether or not the user ascertains that he would like the channel assigned with a high rating score as determined from the majority of users, to be monitored. The user's feedback may then be input and stored by the system, in order to determine whether to initiate monitoring of that channel or not.

In some embodiments, the channel rating score may be a regional rating score calculated based on data obtained from external databases, e.g., regional ratings of users of the broadcasted medium. Data on viewing preferences of regional users may be obtained from external databases, such as rating related databases published on the internet.

Reference is now made to FIG. 2, which is a flowchart of a method 200 for detection of a channel a user is currently listening to or watching, and for monitoring the detected channel for presence of advertisements, according to exemplary embodiments of the disclosed subject matter. Typically, operations 200 may be performed by a system for monitoring and alerting advertisements in broadcasted media, e.g., as described in FIG. 1A.

In operation 210, a predetermined condition triggered by a user may be detected, for example, by a user's computerized apparatus. The predetermined condition may be specified motion of the user's computerized apparatus. Motion of a user's computerized apparatus may, for example, be detected by the computerized apparatus's GPS (Global Positioning System). Motion of a user's computerized apparatus may indicate that the user is traveling, which may also indicate the user may be listening to the radio or watching broadcasted content. Therefore, motion detection may trigger the process of detecting a channel the user is listening to or watching.

Other embodiments may comprise other predetermined conditions that may trigger detection of a channel the user is listening to or watching. For example, if a user regularly listens to or watches a specific channel (or program), detection of the channel the user is listening to or watching may be triggered based on the time and/or day that the user regularly listens to or watches the specific channel. That is, on the day and/or time that the user regularly listens to or watches the channel, a system for detecting and monitoring broadcasted media for presence or absence of advertisements may initiate detection and monitoring of a channel the user is currently listening to or watching for presence or absence of advertisements, according to the operations described hereinafter.

An additional example of a condition that may trigger the system to begin detecting and monitoring may be detected data on a high personal, general or regional rating score determined for at least one channel. A high general rating score may be calculated based on data collected on users' listening and/or viewing preferences received from system users, e.g., users of the same monitoring system, or whether they are substantially all users of the same broadcasted medium that the user is listening to or watching. In other embodiments, the system may be triggered to detect and monitor a channel that the user is listening to or watching, according to the user's stored viewing history or configurations, e.g., repeated hours of activity, calculated based on historical data on the user's regular hours during which the user listens to or watches broadcasted content.

In operation 220, the system may cause the user's computerized apparatus to record an interval of a sound track currently being listened to by the user. In some embodiments, the length of the interval may be predetermined, e.g., may be in a range of up to 500 milliseconds, or may be within a range of 5 seconds to 30 seconds, though the interval may be of other lengths. In some embodiments, the interval of sound track may be recorded by an audio recording unit located within the user's computerized apparatus. For example, the interval of the sound track may be recorded by microphone 1009 incorporated within user's computerized apparatus 1006.

In operation 230, a location of the user's computerized apparatus may be received. In some embodiments, the location of the user's computerized apparatus may be detected by the computerized apparatus's GPS. In other embodiments, the location of the user's computerized apparatus may be determined according to the Internet Protocol (IP) address assigned to the user's computerized apparatus, through which the user is listening to internet radio or is watching internet TV. A processing unit incorporated in the computerized apparatus may receive the location of the computerized apparatus.

In operation 240, a list of local channels being broadcasted in the received location of the user's computerized apparatus may be determined (or within a predetermined radius of the received location), for example by the processing unit 1002 of system 1000 in FIG. 1Az. In some embodiments, any list of local channels being broadcasted at a certain location or radius may be determined from databases that are publicly accessible. Any broadcasted medium pertains a list of channels that may be arranged according to geographical location, e.g., city, country, state, etc.

In operation 250, sound track intervals of the determined channels are continuously recorded by channel monitoring server 1001, and stored by sound track database 1021, which is operationally connected to the channel monitoring server 1001. Sound track database 1021 is configured to store at least a predetermined period of time of the recording, e.g., at least a period of one hour's content may be stored for each monitored channel. In other embodiments, other time periods may be selected, e.g., between one minute to several hours. The content is continuously updated and the earlier recorded sound track may be deleted or archived. The recorded sound tracks are stored with a corresponding time stamp per recording, and the time stamp may be used to determine which recorded portion should be compared to the user interval in order to determine the user's selected channel.

In some embodiments, the sound tracks of the local channels determined by location of the computerized apparatus, e.g., apparatus 1006, may be recorded by an audio recording device, e.g., a microphone. In some embodiments, the sound tracks of the monitored channels may be recorded via the internet, for example channels that have an internet broadcasting service.

In operation 260, the channel the user is currently listening to or watching is detected. One exemplary method of detecting a channel a user is currently listening to or watching is detailed in FIGS. 3-4.

In operation 270, the user is optionally notified that the detected channel is being monitored for presence of advertisements. In some embodiments, processing unit 1002 may generate an alert in order to notify the user that the detected channel is being monitored for presence of advertisements, and the alert may be delivered to the user's computerized apparatus 1006, and may be displayed on a display unit 1010 connected to the user's computerized apparatus. The alert may be displayed to the user in any of auditory or visual manner or any combination of both.

Reference is now made to FIGS. 3-4, which are flowcharts of a method 260 for detection of a channel a user is currently listening to or watching, according to exemplary embodiments of the disclosed subject matter. That is, FIGS. 3-4 describe operation 260 in detail, e.g., how detection of the channel that the user is currently listening to or watching is performed.

In operation 310, at least one sound track interval recorded via the user's computerized apparatus, e.g., by activating a recording unit of the computerized apparatus for at least a predetermined time period. The recorded sound track interval, along with the time and date (e.g., timestamp) of recording may be sent to the channel monitoring server, e.g., wirelessly or cellular or via the internet, and may be compared to recorded sound tracks of each channel in the list of local channels. In some embodiments, the sound track interval is compared to the recorded sound tracks of each of the local channels in the list according to substantially the same time slot that was recorded by the user's computerized apparatus.

The sound tracks of each monitored local channel may be recorded continuously, e.g., by channel monitoring server 1001, and stored in sound track database 1021. In order to efficiently compare and find a match between the recorded interval and the recorded sound tracks, the time of recordation of the sound tracks is required to substantially match the time of recordation of the interval. Therefore, the sound tracks are recorded with a corresponding time stamp per each recording. Comparison between the sound tracks and the interval may be performed during substantially the same time slot or time period of recordation of each of the sound tracks and the received interval, in order to enable a quicker and more reliable result.

In operation 320, a match between the at least one sound track interval recorded by the user's computerized apparatus and the recorded sound tracks of each channel in the list of local channels may be. If sought after a match between the interval and sound tracks is found, in operation 330 it may be determined whether more than one match was found. If more than one match is found, operation 331 follows, which includes sending to the user's computerized apparatus a list of all channels that match the recorded sound track interval, and causing a display unit of the user's computerized apparatus to display the list.

In operation 332, the currently one or more selected channels may be obtained from the user, that is, the user selects one or more channels to be monitored from the list of channels displayed to him in operation 331. In operation 334, following the user's selection of a channel to be monitored, an alert notifying the user that the selected channel is being monitored for presence of advertisements may be generated. In some embodiments, the notification on channel monitoring may be generated by a processing unit 1002 and sent to the user's computerized apparatus. In some embodiments, the notification that the selected channel is being monitored for presence of advertisements may indicate whether the selected channel is currently broadcasting advertisements or a program, or neither advertisements nor a program but rather content that is not part of the broadcasting schedule.

If in operation 330 only one match is found, in operation 333 the channel the user is currently watching or listening to may be determined, and an alert notifying the user that determined channel is being monitored for presence of advertisements may be generated in operation 334. In some embodiments, the notification on channel monitoring may be generated by a processing unit (e.g., processing unit 1002 of channel monitoring server 1001), and may be provided to the user's computerized apparatus, to be displayed by a display unit thereof. In some embodiments, the notification may be displayed in an auditory, or visual manner or in any combination of both.

In the case no match is found between the sound track interval recorded via the user's computerized apparatus and the recorded sound tracks of each channel in the list of local channels (operation 320), in operation 340, a longer interval of a sound track may be recorded via the user's computerized apparatus, e.g., by causing the recording unit of the user's computerized apparatus to record a longer sound interval. The longer interval of a sound track is longer compared to the length of the initial interval of sound track recorded via the user's computerized apparatus. In some embodiments, the longer recorded interval may be longer than the initially recorded interval, e.g., the first interval may be in a time range of 1-5000 milliseconds, and the second (longer) time interval may be longer than 5000 milliseconds, e.g., in a range of seconds to minutes.

In operation 350, the longer sound track interval recorded via the user's computerized apparatus may be compared to the recorded sound tracks of each channel in the list of local channels. Typically, the time slot during which the sound tracks of each local channel is recorded at should substantially match the time slot during which the longer interval of sound track was recorded at, in order to enable a reliable match between the interval and the sound tracks. For example, the length of the sound track selected for comparison by the channel monitoring server 1001, may be longer than the interval recorded by the user's computerized apparatus, e.g. 2-10 times longer.

In operation 360, a match between the longer interval and the sound tracks may be sought. If a match is found, in operation 330 it may be determined whether more than one match was found. If more than one match is found, operation 331 follows, which include displaying all channels that match the recorded sound track interval. In some embodiments, all channels that match the recorded sound tracks may be displayed by a display unit.

In operation 332, the currently selected channel may be obtained from the user, that is, the user selects a channel to be monitored from the list of channels displayed to him in operation 331. In operation 334, following the user's selection of one or more channels to be monitored, an alert notifying the user that the selected channel is being monitored for presence of advertisements may be generated. In some embodiments, the notification on channel monitoring may be generated by a processing unit 1002, and provided to the user's computerized apparatus for display.

If in operation 330 only one match is found, in operation 333 the channel the user is currently watching or listening to may be determined, and an alert notifying the user that said channel is being monitored for presence of advertisements may be generated in operation 334. In some embodiments, the notification on channel monitoring may be generated by a processing unit, and may be displayed by display unit 1010 either incorporated within or connected to the user's computerized apparatus 1006. In some embodiments, the notification may be displayed in an auditory, or visual manner or in any combination of both.

In the case no match is found between the longer interval of sound track recorded via the user's computerized apparatus and the sound tracks of local channels, in operation 370, a list of regional and internet broadcasted channels with respect to the received location of the user's computerized apparatus may be determined. The purpose of operation 370 is to broaden the list of channels that the interval would be compared to, in order to determine the channel that the user is currently listening to or watching.

In operation 380, sound track intervals of the determined regional channels may be recorded. The length of the recorded sound tracks may be predefined, and may be in the range of seconds to minutes. In other embodiments, the regional channels may be recorded continuously, e.g., by channel monitoring server 1001, and stored in sound track database 1021.

In operation 390, at least one sound track interval recorded via the user's computerized apparatus may be compared to recorded sound tracks of each channel in the list of regional and internet channels. In some embodiments, the time slot during which the sound tracks of the regional channels is recorded should substantially match the time slot during which the interval of sound track was recoded via the user's computerized apparatus, in order to perform a reliable match. In some embodiments, a processing unit may perform the comparison between the at least one sound track interval and the sound tracks of the regional channels. In some embodiments, the length of the sound track selected for comparison by the channel monitoring server 1001 from the recorded sound track of the regional and internet channels, may be longer than the interval recorded by the user's computerized apparatus, e.g. 2-10 times longer. In some embodiments, the recorded sound tracks of the regional or internet channels may be longer than the interval recorded by the user's computerized device, with respect to both ends of the interval. That is, the recorded sound tracks of the regional or internet channels may begin at an earlier time period with respect to the time at which the interval is recorded, and the recorded sound track may end at a later time period with respect to the time at which the interval is recorded.

In some embodiments, channel monitoring server 1001 receives the interval recorded via the user's computerized apparatus with a respective time stamp. Channel monitoring server 1001 may compare the time stamp of the recorded interval with the time at which the recorded interval is received by channel monitoring server 1001, and may perform adjustments such to amend the time stamp of the interval recorded via the user's apparatus to the time defined by the channel monitoring server 1001, e.g., when there is a gap between the time defined by the user's apparatus and that defined by the channel monitoring server 1001. The time adjustments performed by the channel monitoring server 1001 may be important in order to properly and efficiently compare the recorded interval to the recorded sound tracks of the regional or internet channels, such that the interval and recorded sound tracks are compared during substantially the same time period.

In operation 400, a match between the recorded interval and sound tracks may be sought. If a match is found, operation 330 follows, which includes the channel monitoring server generating a list of all channels that match the recorded sound track interval, and causing the list to be displayed by the display unit. In some embodiments, all channels that match the recorded sound tracks may be displayed on a display unit.

In operation 332, the currently one or more selected channels may be obtained from the user, that is, the user selects one or more channels to be monitored from the list of channels displayed to him on display unit 1010 incorporated within or connected to the user's computerized apparatus 1006 in operation 331. In operation 334, following the user's selection of a channel to be monitored, an alert notifying the user that the selected channel is being monitored for presence of advertisements may be generated by processing unit 1002 of channel monitoring server 1001.

If in operation 330 only one match is found, in operation 333 the channel the user is currently watching or listening to may be determined, and an alert notifying the user that said channel is being monitored for presence of advertisements may be generated by processing unit 1002 of channel monitoring server 1001 in operation 334. In some embodiments, the notification may be provided to the user's computerized apparatus 1006, and may be displayed on a display unit 1010. In some embodiments, the notification may be displayed in an auditory, visual or vibratory manner or in any combination of the above.

If a match between the interval and the sound tracks of regional channels is not found, in operation 401 a determination as to whether or not the user actively requested monitoring, should be made. If the user did actively trigger monitoring, then in operation 402 an alert notifying the user to manually select a channel to be monitored for presence of advertisements is generated. If the user did not actively trigger monitoring, then in operation 403, the system awaits further input from the user prior to generating any type of alert, in order to avoid user harassment by the system.

Following this entire process 260 of detecting the channel the user is currently listening to or watching, if a match is still not found in operation 400, then the user is asked to manually select the channel he would like to be monitored, assuming the user has actively requested for the system to perform monitoring. In some embodiments, the alert may be displayed to the user by a display unit. In some embodiments, the notification may be displayed in an auditory, or visual manner or in any combination of both.

Reference is now made to FIG. 5, which schematically illustrates a Graphic User Interface (GUI) 500 of a system for detecting and monitoring advertisements in broadcasted media, according to exemplary embodiments of the disclosed subject matter.

In some embodiments, GUI 500 may comprise portion 510, which may comprise information related to TV channels being monitored by the system. Portion 510 may comprise an indicator 501 indicating that portion 510 contains information relevant to TV type broadcasted medium. The number of TV channels being monitored may be predefined by the system, or may be manually configured by the user of the application, e.g., application 1011. For example, portion 510 may display seven channels that are currently monitored, in real-time, by the application, for presence of advertisements. Indicator 512 may indicate the identifier of a channel being monitored, for example channel no. 22. Corresponding indicator 512' may indicate presence or absence of advertisements, i.e., indicator 512' may indicate whether the channel indicated by indicator 512 is currently broadcasting advertisements, or whether it is currently broadcasting a program of some kind, or whether it is currently broadcasting content that is neither a program nor an advertisement, e.g., content that is not part of the broadcasting schedule, for example, a breaking news broadcast, a traffic status announcement, program promotion, and so on. In the example illustrated in FIG. 5, indicator 512' indicates that channel no. 22 is currently on-air, i.e., that channel no. 22 is currently broadcasting a program and not an advertisement. Indicator 513 may indicate that channel no. 10 is being monitored, while corresponding indicator 513' may indicate that channel 10 is currently broadcasting at least one advertisement. Indicator 514 may indicate that channel no. 11 is being monitored, while corresponding indicator 514' may indicate that channel no. 11 is currently broadcasting at least one advertisement. Indicator 515 may indicate that channel no. 56 is being monitored, while indicator 515' indicates that channel no. 56 is currently broadcasting at least one advertisement. Indicator 516 may indicate that channel no. 45 is being monitored, while indicator 516' may indicate that channel no. 45 is currently not broadcasting any advertisements. Indicator 517 may indicate that channel no. 46 is being monitored, while indicator 517' may indicate that channel no. 46 is currently broadcasting at least one advertisement. Indicator 518 may indicate that channel no. 55 is being monitored, while indicator 518' may indicate that channel no. 55 is currently not broadcasting any advertisements.

According to some embodiments, the order in which the monitored TV channels are displayed in portion 510, may be manually configured by the user. In other embodiments, the order of display of the TV channels in portion 510 may be automatically configured by the system, e.g., by processing unit processing unit 1002 of channel monitoring server 1001.

Automatic configuration of the order of display of the channels may be performed according to a 'channel rating score'. A channel rating score, e.g., a personal rating score, general rating score or regional rating score as described above. The personal rating score may be calculated based on historical data of a user. The historical data may be the historical data of the user currently listening to or watching a channel of broadcasted content, or historical data of other users. In some embodiments, historical data of the user may be stored within the system. A processing unit 1002 may then process the historical data, e.g., historical channel selections by the user, and thus based on historical selections of the user, and the frequency at which the user is watching these selected channels, the processing unit may configure a list of channels to be monitored, as well as configure the order of display of these channels. For example, the order of displayed channels may be such that the channel most frequently viewed by the user may be the first channel and may be displayed at the left end of portion 510, while the second most frequently viewed channel appears to the right of the first channel, and so on, such that the channel displayed at the right end of portion 510 is the least frequently viewed channel. In other embodiments, other orders of display of the channels, and different arrangements of the displayed channels along the display may be configured. Furthermore, the user may define the preferred arrangement on the Graphic User Interface, and the preferred order of appearance on the display.

In some embodiments, the channel rating score may be a general rating score that is calculated based on historical data of users other than the current user. For example, historical data of some or all users of the system for detecting and monitoring advertisements in broadcasted media, may be stored within the system. A processing unit may then process the historical data of the users in order to determine per each time of day a list of channels (or program) that the majority of users are viewing. Any channel that the majority of users are watching at the same time of day, would then be assigned with a high rating score. Any other channel broadcasting in that same time slot, viewed by a small number of users, would be assigned with a low rating score. In some embodiments, the system may automatically determine a list of channels that are assigned with a high rating score by the majority of users of the system, as the selected channels that are to be monitored. In other embodiments, the processing unit may generate an alert to the user (which may be displayed by a display unit) as to whether or not the user ascertains that he would like the channel assigned with a high rating score by the majority of users, to be monitored. The user's feedback may then be inputted and recorded by the processing unit, in order to initiate monitoring of that channel or not.

In some embodiments, the channel rating score may be a regional rating score calculated based on data obtained from external databases of regional users of the broadcasted medium. Data on viewing preferences of regional users may be obtained from external databases, such as rating related databases published on the internet. In some embodiments, the list of channels that may be displayed in portion 510 may be automatically configured according to the regional rating of regional TV channels. For example, the channels with a high rating score, e.g., that the majority of regional users are currently viewing, may be configured to be displayed in portion 510. The order of display of these channels may also be configured according to the rating score of regional users, for example, the channel with highest rating score may be the first channel and may be displayed at the left end of portion 510, while the second highest rated channel appears to the right of the first channel, and so on, such that the channel displayed at the right end of portion 510 is the channel with lowest rating score. In other embodiments, other orders of display of the channels, and different arrangements of the displayed channels along the display may be configured. In some embodiments, although portion 510 may have limited space due to the size of the system's display, indicators that appear in portion 510 (or in any other portion along GUI 500) may be scrolled forwards or backwards such that other indicators that follow the ones currently displayed by GUI 500, may be displayed to the user. For example, when the system comprises a touch screen, a user may slide his finger either to the left of portion 510 in order to enable display of indicators that are of lower priority with respect to the indicators currently displayed on portion 510, or the user may slide his finger to the right of portion 510, in order to enable display of indicators that are of a higher priority with respect to the indicators currently displayed on portion 510.

In some embodiments, the indicators, which indicate presence or absence of advertisements, may indicate such information to the user by being assigned with different types of display per type of indication. In some embodiments, the indicators indicating presence or absence of advertisements may be assigned with different colors per each type of indication. For example, an indication regarding presence of advertisements may appear in the color red, while an indication regarding absence of advertisements may appear in the color green. Other colors may be used, as long as the color assigned to indicate presence of advertisements is different from the color assigned to indicate absence of advertisements.

In some embodiments the indicators may appear as a static display, though in other embodiments the indicators may be appear in a flashing or flickering display. In some embodiments, when a change in status of an indicator occurs, the indicator may begin to flicker or flash such to draw the attention of the user to this change in status, for example, when an advertisement session has ended, and a program is broadcasted again, or vice versa. In some embodiments, audio may be added to some or all indicators. Audio may be added when there is a change in status of a channel or program being monitored, e.g., when an advertisement session has ended and a program is broadcasted again, or vice versa. In some embodiments, vibration may be added to indicate a specific or any kind of indicator, or a change in status of the channel or program being monitored, for example, when an advertisement session has ended and a program is broadcasted again, or vice versa.

In some embodiments, a single indicator may be displayed for indicating both the channel identifier as well as the presence and absence of advertisements in that channel. A single indicator may be configured to display the number or any other unique character defining the channel along with an indication regarding the presence of absence of advertisements. For example, indication per presence or absence of advertisements may be displayed as a change in color of the indicator when there is a change in broadcasted content between presence and absence of advertisements.

Other displaying options for indicating the difference between presence and absence of advertisements may include flashing or flickering to indicate presence of advertisements, while a static display appears to indicate absence of advertisements, or vice versa. In some embodiments, audio or vibration may be added to either one of the statuses of a broadcasted content (whether presence or absence of advertisements). In other embodiments, other displaying options for indicating the difference between presence and absence of advertisements may be implemented.

In some embodiments, GUI 500 may comprise portion 520, which may display information on radio channels being monitored by the system. Portion 520 may comprise indicator 521 indicating that portion 520 contains information relevant to radio type broadcasted medium. The number of radio channels/stations being monitored may be predefined by the system, or may be manually configured by the user of the system. For example, portion 520 may comprise four channels that are monitored, in real-time, by the system, for presence of advertisements. Indicator 522 may indicate the number of a channel being monitored, for example channel no. 99FM. Corresponding indicator 522' may indicate presence or absence of advertisements in the channel indicated by indicator 522. Indicator 522' may indicate whether the channel indicated by indicator 512 is currently broadcasting at least one advertisement, or whether it is currently broadcasting non-advertisement related content, e.g., that the channel is broadcasting a program of some kind, or whether it is currently broadcasting content that is neither a program nor an advertisement, e.g., content that is not part of the broadcasting schedule, for example, a breaking news broadcast, a traffic status announcement, program promotion, and so on. In the example illustrated in FIG. 5, indicator 522' indicates that channel no. 99FM is currently broadcasting at least one advertisement. Indicator 523 may indicate that channel no. 102FM is being monitored, while corresponding indicator 523' may indicate that channel 102FM is currently not broadcasting any advertisements. Indicator 524 may indicate that channel 91FM is being monitored, while corresponding indicator 524' may indicate that channel 91FM is currently not broadcasting any advertisements nor is it broadcasting any program, e.g., channel 91FM is broadcasting content that is 'in-between' program related content and advertisement related content. Indicator 525 may indicate that channel 93.5FM is being monitored, while indicator 525' may indicate that channel 93.5FM is currently not broadcasting any advertisements.

According to some embodiments, the order in which the monitored radio channels are displayed in portion 520, may be manually configured by the user. In other embodiments, the order of display of the radio channels in portion 520 may be automatically configured by the system, e.g., by a processing unit. Automatic configuration of the order of display of the channels may be performed according to a 'channel rating score', e.g., a personal rating score, general rating score or regional rating score as described above. The personal rating score may be a calculated per user based on historical data of the user. The historical data may be the historical data of the user currently listening to or watching a channel of broadcasted content, or historical data of other users. In some embodiments, historical data of the user may be stored within the system, e.g., by user profile database 1022. A processing unit 1002 may then process the historical data, e.g., historical channel or program selections by the user, and thus based on historical selections of the user, and the frequency at which the user is listening to these selected channels or programs, the processing unit may configure a list of channels to be monitored, as well as configure the order of display of these channels. The order of displayed channels may be such that the channel most frequently listened to by the user may be the first channel and may be displayed at the left end of portion 520, while the second most frequently listened to channel appears to the right of the first channel, and so on, such that the channel displayed at the right end of portion 520 is the least frequently listened to channel. In other embodiments, other orders and different arrangements of display of the channels, may be configured. Furthermore, the user may define the preferred arrangement on the Graphic User Interface, and the preferred order of appearance on the display.

In some embodiments, the channel rating score may be a general rating score that is calculated based on historical data of users other than the current user. For example, historical data of some or all users of the system for detecting and monitoring advertisements in broadcasted media, may be stored within the system. A processing unit may then process the historical data of the users in order to determine per each time of day a list of channels (or program) that the majority of users are listening to. Any channel that the majority of users are listening to at the same time of day, would then be assigned with a high rating score. Any other channel broadcasting in that same time slot, listened to by a small number of users, would be assigned a low general rating score. In some embodiments, the system may automatically determine a list of channels that are assigned with a high rating score by the majority of users of the system, as the selected channels that are to be monitored. In other embodiments, the processing unit may generate an alert to the user (which may be displayed by a display unit) as to whether or not the user ascertains that he would like the channel assigned with a high rating score by the majority of users, to be monitored. The user's feedback may then be inputted and recorded by the processing unit, in order to initiate monitoring of that channel or not.

In some embodiments, the channel rating score may be a regional rating score calculated based on data obtained from external databases of regional users of the broadcasted medium. Data on listening preferences of regional users may be obtained from external databases, such as rating related databases published on the internet. In some embodiments, the list of channels that may be displayed in portion 520 may be automatically configured according to the regional rating of regional radio channels. For example, the channels with a high rating score, e.g., that the majority of regional users are currently listening to, may be configured to be displayed in portion 520. The order of display of these channels may also be configured according to the rating score of regional users, for example, the channel with highest rating score may be the first channel and may be displayed at the left end of portion 520, while the second highest rated channel appears to the right of the first channel, and so on, such that the channel displayed at the right end of portion 520 is the channel with lowest rating score. In other embodiments, other orders of display of the channels, and different arrangements of display may be configured.

As described above in detail with respect to portion 510, portion 520 may also be scrolled forwards or backwards such that other indicators that follow the ones currently displayed by GUI 500, may be displayed to the user.

In some embodiments, display 500 may further comprise a portion dedicated to monitoring of channels of internet radio or internet TV (not shown) or any other broadcasted medium. Furthermore, in some embodiments the list of channels may also include channels that are not being monitored, and an appropriate indication may be displayed along these channels' identifiers.

In some embodiments, the indicators, which indicate presence or absence of advertisements, may indicate such information to the user by being assigned with different types of display per type of indication. In some embodiments, the indicators indicating on presence or absence of advertisements may be assigned with different colors per each type of indication. For example, an indication regarding presence of advertisements may appear in the color red, while an indication regarding absence of advertisements may appear in the color green. Other colors may be used, as long as the color assigned to indicate presence of advertisements is different from the color assigned to indicate absence of advertisements. In some embodiments the indicators may appear as a static display, though in other embodiments the indicators may be appear in a flashing or flickering display. In some embodiments, when a change in status of an indicator occurs, the indicator may begin to flicker or flash such to draw the attention of the user to this change in status, for example, when an advertisement session has ended, and a program is broadcasted again, or vice versa. In some embodiments, audio may be added to some or all indicators. Audio may be added when there is a change in status of a channel or program being monitored, e.g., when an advertisement session has ended and a program is broadcasted again, or vice versa. In some embodiments, vibration may be added to indicate a specific or any kind of indicator, or a change in status of the channel or program being monitored, for example, when an advertisement session has ended and a program is broadcasted again, or vice versa. In some embodiments, a single indicator may be displayed for indicating both the channel identifier as well as the presence and absence of advertisements in that channel. A single indicator may be configured to display the number or any other unique character defining the channel along with an indication regarding the presence of absence of advertisements. For example, indication per presence or absence of advertisements may be displayed as a change in color of the indicator when there is a change in broadcasted content between presence and absence of advertisements. Other displaying options for indicating the difference between presence and absence of advertisements may include flashing or flickering to indicate presence of advertisements, while a static display appears to indicate absence of advertisements, or vice versa. In some embodiments, audio or vibration may be added to either one of the statuses of a broadcasted content (whether presence or absence of advertisements). In other embodiments, other displaying options for indicating the difference between presence and absence of advertisements may be implemented.

In some embodiments, the user may use his computerized apparatus for an additional operation or application besides watching or listening to a channel or program, for example, the user may be using his computerized apparatus to conduct a phone call. If a change in status of a channel or program occurs during this additional operation, the user may be notified in such a way that will not disturb or interrupt the user's additional operation or application, for example, by a visually flashing signal, by a vibration alert, and so on. In some embodiments, GUI 500 may further comprise portion 530. Portion 530 may display a number of configurable user selection boxes that may enable the user to manually configure various parameters related to detection of a channel the user is listening to or watching. In some embodiments, the user may select either indicator 501 or indicator 521, i.e., the user may select the broadcasted medium the user would like monitored, whether TV, which is indicated by indicator 501, or radio, which is indicated by indicator 521. Portion 530 may be defined according to the user's selection of the medium the user would like monitored. When the user selects indicator 501, portion 530 is configured to enable the user to select various parameters corresponding to TV channels and/or programs, whereas if the user selects indicator 521, portion 530 is configured to enable the user to select various parameters corresponding to radio channels and/or programs. In some embodiments, a user may select an indicator (not shown) that may cause portion 530 to enable the user to select various parameters corresponding to internet radio channels and/or programs.

In some embodiments, portion 530 may comprise configurable user selection box 531, which may enable the user to manually configure the location the user is located at, or the location for which the user would like the system to detect possible channels to be monitored. Portion 530 may further comprise configurable user selection box 532, which may enable the user to manually configure the date for requested monitoring of certain channels. In some embodiments, the user may choose to configure the real date of the day the user is using the system at, though in other embodiments, the user may choose to configure a future date, in order to configure the system to monitor a channel or program at a later time. Thus, the user may configure the system to monitor a certain channel or program ahead of time, prior to broadcast time of the channel or program. In some embodiments, portion 530 may further comprise configurable user selection box 533, which may enable the user to select a specific channel the user wishes the system to monitor.

The list of channels may correspond to the type of broadcasted medium selected by the user, whether TV, radio, internet radio, or any other broadcasted medium of the sort. As explained above, if the user selects indicator 501, the list of channels provided by configurable user selection box 533, corresponds to TV channels. Whereas, if the user selects indicator 521, the list of channels provided by configurable user selection box 533, corresponds to radio channels. If the user selects an indicator corresponding to internet radio, the list of channels provided by configurable user selection box 533 would correspond to internet radio channels, and so on per any type of broadcasted medium. In some embodiments, by selecting the location in configurable user selection box 531, channels corresponding to that location may be provided by configurable user selection box 533. For example, a radio station typically has a different number per different geographical locations (to ensure proper transmission/broadcast), thus selecting the location in configurable user selection box 531 would automatically adjust the number of the listed channels provided by configurable user selection box 533 to match the location of the user.

In some embodiments, portion 530 may further comprise indicator 534, which the user may select when the user would like the application, e.g., application 1011 to automatically detect the channel that the user is watching or listening to according to the sound track of the content the user is currently watching or listening to. The application may record an interval of a sound track currently listened to by the user, via an audio recording device incorporated in the user's computerized apparatus, e.g., via microphone 1009. The application may then compare the interval of the sound track recorded by the user's apparatus to sound tracks of channels broadcasted around the location of the user's apparatus and thus detects the channel/program that the user is currently watching or listening to (as described in detail with respect to FIGS. 2-4).

In some embodiments, portion 530 may further comprise a user selection box 535, which may enable the user to manually search for a program by name. In some cases, the user doesn't know in which channel a TV or radio program is being broadcasted, thus once user selection box 535 is selected, a list of programs may be searched through by the user. In some embodiments, the list of programs may include a list of programs frequently watched or listened to by the user. In other embodiments, the list of programs may include a list of local or regional programs broadcasted in the location of the user's apparatus (wherein the location of the user's apparatus may be determined by the localization system, e.g., localization system 1012 incorporated in the user's apparatus).

Portion 540 may display detailed information related to the broadcasting schedule (or programs list) of each channel, per the date. For example, once the user selects all configurable parameters, e.g., location, date and channel, by using configurable user selection boxes 531, 532, and 533, respectively, portion 540 may display a broadcasting schedule that corresponds to the selections of the user. In some embodiments, portion 540 may display a broadcasting schedule for more than one channel. For example, portion 540 may display the broadcasting schedule for TV channel 22, within sub-portion 541. Portion 540 may further display the broadcasting schedule for TV channel 10, within sub-portion 542. Portion 540 may comprise additional sub-portions for displaying broadcasting schedules per additional channels. The number of sub-portions may be manually configurable by the user, or may be automatically configurable, e.g., according to the physical space on the display screen of the user's computerized apparatus, on which the application, e.g., application 1011 for detecting and monitoring advertisements is running. In other embodiments, the user may scroll the sub-portions of portion 540 backwards or forwards such that new sub-portions may appear on portion 540 instead of previously displayed sub-portions. For example, if the user's computerized apparatus comprises a touch screen, the user may slide his finger to the right or to the left of portion 540 in order to enable display of broadcasting schedule of other channels.

The user may manually select a specific program the user would like monitored by the system, by selecting the program from the broadcasting schedule. Once a program is selected by the user, the system begins real-time monitoring of the program for detection of presence or absence of advertisements. In some embodiments, the user may select monitoring of more than one program. Regardless of first selecting monitoring of one or more programs, the user may configure whether or not the user may receive an alert prior to the beginning of the at least one selected program, indicating that the program is about to begin. The user may further configure the time frame during which such an alert may be displayed to the user, e.g., how many minutes prior to beginning of broadcasting of the selected program, the user may receive an alert. In some embodiments, the user may further configure the type of the alert indicating the beginning of the program, whether it being an auditory alert, a visual alert, an alert comprising vibration, or any combination of the above.

In some embodiments, the user may configure the type of alert that the system may generate and display to indicate presence and absence of advertisements, e.g., whether the alert is in auditory or visual manner, or in any combination of both. In some embodiments, the alert may further comprise vibration to some extent (which may also be configurable by the user), while in other embodiments, the alert may solely be in the manner of vibration of the user's computerized apparatus.

In some embodiments, GUI 500 may further comprise an indicator that enables the user to send a notification to other users regarding the program the user is currently watching or is intending to watch later on. The user may configure a list of at least one user with whom the user may share his viewing or listening preferences. The at least one user that receives information of the first user's preferences may then have the option to configure the system in his computerized apparatus to monitor that same channel. Thus, users may initiate system monitoring of broadcasted media for presence of advertisements in response to other users' suggestions.

Reference is now made to FIG. 6, which schematically illustrates a GUI 600 of an application for monitoring advertisements in broadcasted media, according to exemplary embodiments of the disclosed subject matter. In some embodiments, display 600 may comprise portion 610, which may comprise the main display of any application other than the application for monitoring advertisements, which the user is currently operating on his computerized apparatus.

While the user is operating his computerized apparatus or executing other types of applications, e.g. maps application, messaging application, etc., the application, e.g., application 1011 for monitoring presence of advertisements in broadcasted media may generate an alert or provide an indication to the user that at least one channel of a broadcasted medium is being monitored. In some embodiments, the user may execute, operate or run any other application substantially simultaneously with the advertisement monitoring application on the user's computerized apparatus, while the advertisement monitoring application may be displayed in a portion of a display unit of the user's computerized apparatus, and the other application may be displayed in another portion of a display unit as the main active application operated by the user.

In some embodiments, even when the display of the user's apparatus is closed, e.g., when the user's computerized apparatus is locked; when an alert is generated by the advertisement monitoring application regarding presence or absence of advertisements, the alert may appear on the display of the user's computerized apparatus.

In some embodiments, the advertisement monitoring application, e.g., application 1011, may be displayed at the periphery of the display of the main application currently being executed on the user's computerized apparatus. As illustrated in FIG. 6, display 600 may comprise portions that may display information that relate to channels of broadcasted media that are currently being monitored by the monitoring application. For example, display 600 may comprise portion 611, which may display information regarding presence or absence of advertisements in one or more TV channels currently being monitored. Display 600 may further comprise portion 621, which may display information regarding presence or absence of advertisements in one or more radio stations currently being monitored. Display 600 may comprise additional portions (not shown) that may display information regarding presence or absence of advertisements in internet radio, or in any other broadcasted medium.

The indications regarding presence or absence of advertisements may be received in real time or substantially in real time, from the channel monitoring server 1001 of FIG.

1A. The determination of presence or absence of advertisements, per channel, may be received by the server or analyzed from the received broadcasted media of the channel, and the corresponding indication may be received by the user's computerized apparatus, in real time, for all channels being monitored according to the user's selection or according to a predetermined setting.

In some embodiments, portions 611 and 621 may be positioned on the user's computerized apparatus display unit such as to not interrupt with the display of the main application running in the user's computerized apparatus, e.g., portions 611 and 621 are positioned along display 600 such to avoid an overlap of any kind with portion 610. In some embodiments, the location of portion 611 may be a predefined setting which is automatically configured in the application, e.g., application 1011. For example, portion 611 may be positioned at either side of portion 610, immediately adjacent to portion 610. In other embodiments, portion 611 may be positioned at the top or bottom of portion 610, or at any other location within display 600 that will not interfere or disturb the display of portion 610.

In yet other embodiments, the location of portion 611 may be configurable by the user. For example, the user may configure the location and size of portion 611 or any other portion in display 600, e.g. during an initial configuration of the application, e.g., application 1011, upon installation, or during thereafter. However, in other embodiments, the user may configure the location and size of portion 611 at any desired moment by, for example, dragging portion 611 to a new location, changing the size of portion 611, and so on. Dragging portion 611, changing the size of portion 611 and so on, may be done manually by the user by, for example, using the user's finger, for an application operating on a computerized apparatus comprising a touch-screen input unit. Such configuring operations may also be performed using a cursor, a remote control, an external input unit, and so on.

In some embodiments, the location of portion 621 may also be a predefined setting determined by the application/system, though in other embodiments, the location of portion 621 may be configured by the user similarly to the configuration of portion 611. For example, portion 621 may be positioned at either side of portion 610. In other embodiments, portion 621 may be positioned at the top or bottom of portion 610, or at any other location along display 600 that will not interrupt with the display of portion 610. In yet other embodiments, the location and size of portion 621 may be configured by the user. For example, the user may configure the location and size of portion 621 or any other portion in display 600, during initial configuration of the application. However, in other embodiments, the user may configure the location and size of portion 621 at any desired moment by, for example, dragging portion 621 to a new location, changing the size of portion 621, and so on. Dragging portion 621, changing the size of portion 621 and so on, may be done by the user manually by, for example, using the user's finger, assuming the application is operating on a computerized apparatus comprising touch-screen. Such configuring operations may also be performed using a cursor, a remote control, and so on.

In some embodiments, portion 611 may comprise an indicator 601, e.g. a button or a text box defined in the GUI 600, which may indicate that portion 611 displays information regarding TV channels. Portion 611 may further comprise indicators indicating which TV channels are monitored by the application, e.g., application 1011, as well as indicators indicating presence or absence of advertisements per each monitored channel. The number of monitored channels may be predefined in the application, or may be manually configured by the user of the application. For example, portion 611 may comprise indicator 612, which may indicate that TV channel 55 is being monitored for presence of advertisements. Corresponding indicator 612' may indicate presence or absence of advertisements in channel 55. In the example illustrated in FIG. 6, indicator 612' indicates that channel 55 is currently not broadcasting advertisements but is rather broadcasting other content, e.g., a program of some kind. Indicator 613 may indicate that TV channel 46 is being monitored, while corresponding indicator 613' may indicate that channel 46 is currently broadcasting advertisements. Indicator 614 may indicate that TV channel 45 is being monitored, while corresponding indicator 614' may indicate that channel 45 is currently not broadcasting advertisements. Indicator 615 may indicate that TV channel 56 is being monitored, while corresponding indicator 615' may indicate that channel 56 is currently broadcasting advertisements. Indicator 616 may indicate that TV channel 11 is being monitored, while corresponding indicator 616' may indicate that channel 11 is currently broadcasting advertisements. Indicator 617 may indicate that TV channel 10 is being monitored, while corresponding indicator 617' may indicate that channel 10 is currently broadcasting advertisements. Indicator 618 may indicate that TV channel 22 is being monitored, while corresponding indicator 618' may indicate that channel 22 is currently not broadcasting advertisements, but is rather broadcasting other content, e.g., a program of some kind.

In some embodiments, the order in which the indicators indicating the number of the TV channel being monitored are displayed on the GUI 600, as well as the display of their corresponding indicators indicating presence or absence of advertisements per each monitored channel, may either be automatically configured by the system or may be manually configured by the user.

Automatic configuration of the order of display of the channel related indicators may be performed according to the 'channel rating score' described herein. The order of displayed channels indicators may be arranged according to a personal rating score such that the channel most frequently viewed by the user may be the first channel indicator and may be displayed at the very bottom of portion 611, while the second most frequently viewed channel indicator appears above the first channel indicator, and so on, such that the channel indicator displayed at the uppermost end of portion 611 is the channel least frequently viewed by the user. In other embodiments, other orders or arrangements of display of the channels' indicators may be reconfigurable.

In some embodiments, the channel rating score may be a general rating score that is calculated based on historical data of users other than the current user. For example, historical data of some or all users of the system for detecting and monitoring advertisements in broadcasted media, may be stored within the system. A processing unit may then process the historical data of the users in order to determine per each time of day a list of channels (or programs) that the majority of users are viewing. Any channel that the majority of users are watching at the same time of day, would then be assigned a high rating score. Any other channel broadcasting in that same time slot, viewed by a small number of users, would be assigned a low rating score. In some embodiments, the system may automatically determine a list of channels that are assigned with a high rating score by the majority of users of the system, as the selected channels that are to be monitored. In other embodiments, the processing unit may generate an alert to the user (which may be displayed by a display unit) as to whether or not the user ascertains that he would like the channel assigned with a high rating score by the majority of users, to be monitored. The user's feedback may then be recorded by the processing unit (e.g., stored in a user profile data structure associated with the specific user), in order to determine whether to initiate monitoring of that channel or not.

In some embodiments, the channel rating score may be a regional rating score calculated based on data obtained from external databases of regional users of the broadcasted medium. Data on viewing preferences of regional users may be obtained from external databases, such as rating related databases or websites or publicly accessible data published, e.g., on the internet. In some embodiments, the list of channels that may be displayed in portion 611 may be automatically configured according to the regional rating score of regional TV channels. For example, the channels with a high rating score, e.g., that the majority of regional users are currently viewing, may be configured to be displayed in portion 611. The order of display of these channels may also be configured according to the rating score of regional users, for example, the channel with highest rating score may be the first channel and may be displayed at the very bottom of portion 611, while the second highest rated channel appears above the first channel, and so on, such that the channel displayed at the uppermost end of portion 611 is the channel with lowest rating score. In other embodiments, other orders of display of the channels may be configured.

In some embodiments, the indicators 612-618, which indicate presence or absence of advertisements, may indicate such information to the user by being assigned with different types of graphical display per type of indication. In some embodiments, the indicators indicating the presence or absence of advertisements may be assigned with different colors per each type of indication. For example, an indication regarding presence of advertisements may appear in the color red, while an indication regarding absence of advertisements may appear in the color green. Other colors may be used, as long as the color assigned to indicate presence of advertisements is different from the color assigned to indicate absence of advertisements. In some embodiments the indicators may appear as a static display, though in other embodiments the indicators may be appear in a flashing or flickering display. In some embodiments, when a change in status of an indicator occurs, the indicator may begin to flicker or flash such to draw the attention of the user to this change in status, for example, when an advertisement session has ended, and a program is broadcasted again, or vice versa. In some embodiments, audio may be added to some or all indicators.

Audio may be added when there is a change in status of a channel or program being monitored, e.g., when an advertisement session has ended and a program is broadcasted again, or vice versa. In some embodiments, vibration may be added to indicate a specific or any kind of indicator, or a change in status of the channel or program being monitored, for example, when an advertisement session has ended and a program is broadcasted again, or vice versa.

In some embodiments, portion 621 displayed in display 600 may comprise an indicator 602, which may indicate that portion 621 displays information regarding radio channels. Portion 621 may further comprise indicators indicating which radio channels are monitored by the application, e.g., application 1011, as well as indicators indicating presence or absence of advertisements per each monitored channel. The number of monitored channels may be predefined by the application, or may be manually configured by the user of the application. For example, portion 621 may comprise indicator 622, which may indicate that radio channel 99FM is being monitored for presence of advertisements. Corresponding indicator 622' may indicate presence or absence of advertisements in channel 99FM. In the example illustrated in FIG. 6, indicator 622' indicates that channel 99FM is currently broadcasting advertisements. Indicator 623 may indicate that radio channel 102FM is being monitored, while corresponding indicator 623' may indicate that channel 102FM is currently not broadcasting advertisements but is rather broadcasting other content, e.g., a program of some kind. Indicator 624 may indicate that radio channel 91FM is being monitored, while corresponding indicator 624' may indicate that channel 91FM is currently not broadcasting advertisements. Indicator 625 may indicate that radio channel 93.5FM is being monitored, while corresponding indicator 625' may indicate that channel 93.5FM is currently not broadcasting advertisements.

In some embodiments, the order in which the indicators indicating the number of the radio channel being monitored, as well as their corresponding indicators indicating presence or absence of advertisements per each monitored channel, may either be automatically configured by the system or may be manually configured by the user.

Automatic configuration of the order of display of the radio channel related indicators may be performed according to a 'channel rating score', similarly to the automatic order described for the TV channel.

In some embodiments, display 600 may further comprise a portion dedicated to monitoring of channels of internet radio (not shown) or of any other broadcasted medium.

Reference is now made to FIG. 7, which schematically illustrates a display 702 of a device 700 for monitoring advertisements on TV, according to exemplary embodiments of the disclosed subject matter.

An attachable device 700 for monitoring presence or absence of advertisements in TV channels may be attached to or positioned in the vicinity of television 701. Device 700 may wirelessly communicate with a user's computerized apparatus, and/or may wirelessly communicate with server 1001. Thus, an application for monitoring advertisements, which may be operating on the user's computerized apparatus, may be able to provide, in real-time, information regarding presence or absence of advertisements in TV channels to device 700. In some embodiment, device 700 may communicate with the user's computerized apparatus and/or with server 1001 through Bluetooth communication, cellular communication, wireless LAN, Wi-Fi, or any other means of communication may be used. Device 700 may comprise display 702.

In some embodiments, display 702 may comprise portion 710, which may display a list of TV channels selected according to a channel rating score, e.g., a personal rating score, a general rating score or a regional rating score as described with relation to FIG. 6 herein. The order of displayed channels indicators may be such that the channel most frequently viewed by the user may be the first channel indicator, and may be displayed at the left end of portion 710, while the indicator associated with the second most frequently viewed channel appears to the right of the first channel, and so on, such that the channel indicator displayed at the right end of portion 710 is associated with the least frequently viewed channel. In other embodiments, other orders of display of the channels indicators may be configurable, e.g., predetermined or reconfigurable by the user. The number of displayed and monitored channels may be predefined by the application or manually configurable by the user.

In some embodiments, the channel rating score may be a score that is calculated based on historical data of users other than the current user. For example, historical data of some or all users of the application, e.g., application 1011 for detecting and monitoring advertisements in broadcasted media, may be stored within the system. A processing unit may then process the historical data of the users in order to determine per each time of day a list of channels (or programs) that the majority of users are viewing. Any channel that the majority of users are watching at the same time of day, would then be assigned with a high rating score. Any other channel broadcasting in that same time slot, viewed by a small number of users, would be assigned with a low rating score. In some embodiments, the system may automatically determine a list of channels that are assigned with a high rating score by the majority of users of the system, as the selected channels that are to be monitored. In some embodiments, the channel rating score may be calculated based on data obtained from external databases of regional TV users/viewers. Data on viewing preferences of regional users/viewers may be obtained from external databases, such as rating related databases published on the internet. In some embodiments, the list of TV channels that may be displayed in portion 710 may be automatically configured according to the regional rating of regional TV channels. For example, the channels with a high rating score, e.g., that the majority of regional users are currently viewing, may be configured to be displayed in portion 710. The order of display of these channels may also be configured according to the rating score of regional users, for example, the channel with highest rating score may be the first channel and may be displayed at the left end of portion 710, while the second highest rated channel appears to the right of the first channel, and so on, such that the channel displayed at the right end of portion 710 is the channel with lowest rating score. It is clear that the rating score may be dynamic and may continuously change, thus order of channels display may also change accordingly. In other embodiments, other orders of display of the channels may be configured.

In some embodiments, portion 710 displays a list of indicators each indicating a channel as well as the status of that channel, e.g., whether advertisements are broadcasted or whether content other than advertisements is broadcasted, e.g., a program of some kind. The indicators all indicate channels (and their status) selected according to the channel rating score, as described above in detail.

All Indicators may display the channel number or any other defining characteristic unique to the channel they are associated with, and which is being monitored for presence or absence of advertisements. Furthermore, the display of each indicator may characterize the status of the channel it indicates, e.g., whether advertisements are currently broadcasted, or whether an advertisement session is currently over, and a program is now broadcasted. For example, each indicator may be displayed in one color to indicate presence of advertisements, while each indicator may be displayed in a different color to indicate absence of advertisements. Other types of different displays per different status indications may be implemented. Some display configurations may include flickering or flashing of the indicators, addition of audio or vibration and so on.

In the example illustrated in FIG. 7, indicator 711 may indicate that channel no. 22 is being monitored. The color of indicator 711 may indicate presence or absence of advertisements. For example, the color of indicator 711 is green, which indicates that channel 22 is currently not broadcasting advertisements. Similarly, indicator 712-721 and corresponding indicators 712'-721' may each indicate that other channels (e.g., channels 56, 55, 8, 45, etc.) are currently being monitored. When the color of an indicator is red (e.g., indicator 713), this may indicate that channel is currently broadcasting advertisements. When the color of an indicator is yellow (e.g., indicator 721), this may indicate that channel is currently not broadcasting neither advertisements nor a program, e.g., content that is not part of the broadcasting schedule, for example, breaking news broadcast, traffic status announcement, program promotion, and so on.

Other numbers of channels may be displayed and other visual indications besides colors may be used. The number of displayed channels may be predefined by the system or manually configured by the user. Other colors for indicating presence or absence of advertisements may be implemented. In some embodiments, display 702 may comprise portion 730, which may display TV channels according to the user's last viewing preferences. User profile database 1022 may be used to store each of the users' profiles, which includes: each show or program that the user requested monitoring for, settings for preferred display of the GUI of application 1011, typical viewing/listening periods, accumulated viewing/listening time per channel, etc. The data of the user's profile may be transmitted from user's profile database 1022 to the user's computerized apparatus 1006, such that application 1011 may provide, in real-time, information regarding the user's preferences to device 700. In some embodiments, device 700 may communicate directly with channel monitoring server 1001, thus data of the user's profile may be transmitted from the user's profile database 1022 directly to device 700. The TV channels that the user recently viewed on TV are displayed in portion 730. The order of display of the last viewed TV channels may be arranged according to chronological order, e.g., according to the chronological time of viewing each channel, such that, for example, the channel viewed first would be displayed on the left end of portion 730, the channel viewed second would be displayed on the right to the first channel, and so on, until the last channel displayed at the right end of portion 730 is the channel viewed last. It is clear that the order of viewing the channels by the user is dynamic, since the user may continuously change the order of viewing, therefore, the order of display of the channels in portion 730 may continuously change accordingly.

Another possible arrangement of the channels may be based according to the accumulated viewing time of each channel, such that the channel that was viewed for the longest time period would be considered the first channel and its corresponding indicator may be displayed at the left end of portion 730, the indicator associated with the channel viewed for a shorter time period (compared to the first channel) would be displayed on the right of the first channel, and so on until the channel viewed for the shortest time period may be displayed at the right end of portion 730. Other arrangements may be implemented.

Each indicator may display the channel number or any other defining characteristic unique to the channel it is associated with, and which is being monitored for presence or absence of advertisements. Furthermore, the display of each indicator may characterize the status of the channel it indicates, e.g., whether advertisements are currently broadcasted, or whether an advertisement session is currently over, and a program is now broadcasted. For example, each indicator may be displayed in one color to indicate presence of advertisements, while each indicator may be displayed in a different color to indicate absence of advertisements. Other types of different displays per different status indications may be implemented. Some display configurations may include flickering or flashing of the indicators, addition of audio or vibration and so on.

Indicator 731 may indicate that channel no. 10 is currently being monitored. Similarly to portion 710, the color of indicators 731-736 may indicate presence or absence of advertisements. For example, the color of indicator 731 is red, which indicates that channel 10 is currently broadcasting advertisements. The color of indicator 732 is green, thus indicating that channel 45 is currently not broadcasting advertisements. Other colors indicating presence or absence of advertisements may be implemented. Other numbers of channels may be displayed. The number of displayed channels may be predefined by the system or manually configured by the user.

In some embodiments, data on the channels last viewed by the user may be stored either by the application, e.g., application 1011 on the user's computerized apparatus 1006, e.g., in storage unit 1008, or may be stored by user profile database 1022 and be transmitted to application 1011 that is installed on user's computerized apparatus 1006. The data may then be transmitted to device 700 from the user's computerized apparatus, e.g., computerized apparatus 1006.

In some embodiments, display 702 may further comprise portion 740, which may display a list of TV channels manually selected by the user/viewer. The order of display of the manually selected channels may be configurable by the user. In the example illustrated in FIG. 7, indicators 741-744 may indicate that channel 2 22, 55, 56 and 10 are currently being monitored. The color of indicators 741-744 may be indicative of the monitoring status, e.g. green color may indicate that a certain channel is currently not broadcasting advertisements but is rather broadcasting other content, e.g., a program of some kind, while a red color may indicate that the associated channel is currently broadcasting advertisements. Other colors indicating presence or absence of advertisements may be implemented. Other numbers of channels may be displayed. The number of displayed channels may be predefined by the system or manually configured by the user.

In some embodiments, the user may configure which of portions 710, 730 and 740 may be displayed. The user may further configure other characteristics of display portions 710, 730 and 740, such as the size of display of these portions, the order of display of these portions, and so on.

In some embodiments, display 702 need not be displayed by device 700 which is a device separate from TV 701. Instead, display 702 may be displayed directly on a TV screen, e.g., the screen of TV 701, either alongside a currently viewed channel, as an overlaid portion on top of the broadcasted program, or on a specially assigned separate channel. The information regarding presence or absence of advertisements, which is received from the channel monitoring server 1001 by the application, e.g., application 1011 operating on the user's computerized apparatus, may be directly transmitted to the TV cable/channel converter and thus be directly displayed on the TV screen, instead of being transmitted to a separate device, e.g., device 700.

According to some embodiments, monitoring, in real-time, of a channel broadcasted in any of the broadcasted media for presence of advertisements, may be performed by various means. In some embodiments, monitoring a channel for presence of advertisements may be performed automatically, e.g., by a processor of a channel monitoring server, e.g., processing unit 1002. Automatic methods for detecting advertisements may comprise detecting a feature of the broadcasted segment that indicates an advertisement is about to be broadcasted, e.g., advertisements are often played at a different, e.g., higher volume than that of a program, therefore a volume increase (without a command from the user) may indicate that an advertisements is being broadcasted. The channel monitoring server, e.g., channel monitoring server 1001, may receive a continuous stream of the broadcasted data from each channel, and may automatically determine that an advertisement is currently being broadcasted if there was a sudden change, e.g., an increase in the content's volume.

In other examples, e.g., in advertisements broadcasted on the radio, the advertisements are typically broadcasted after a short "jingle" that is specific to the channel or program currently broadcasted, and that same "jingle" is typically played again at the end of the advertisement session, prior to returning to the broadcasted program. Therefore, one or more "jingles" may be associated with a channel, and upon detecting that the "jingle" was broadcasted, the channel monitoring server 1001 may determine that a session of advertisements is currently being broadcasted, and upon detecting a "jingle" associated with the monitored channel again, the channel monitoring server 1001 may determine that the advertisement session has ended, and so on. Upon each determination of a change in the status of a monitored channel, the channel monitoring server 1001 may transmit a corresponding indication to the user's computerized device 1006, and cause an appropriate alert or indication to be displayed on a display unit operationally connected to the computerized device.

In some embodiments, an advertisements database 1023 may store any advertisement and "jingle" that were detected during broadcast, and may be configured to store any newly broadcasted advertisement or jingle. Channel monitoring server 1001 may determine that an advertisement or jingle, which are stored by advertisements database 1023 are currently broadcasted, thus channel monitoring server 1001 may transmit an indication to the user's computerized apparatus 1006 regarding presence of advertisements.

On TV, "jingles" per a channel or concessionaire of a channel are also often played prior to broadcast of advertisements and then again at the end of an advertisement session and prior to the beginning of a program, thus the same method of detecting jingles in the radio may be used to indicate presence or absence of advertisements on TV. Additional examples for automatic detection of advertisements on TV may include detection of scene/shot breaks or scene changes that are more common during advertisements, so as to increase interest of the viewer. Another example may include detection of action, since advertisements may typically have more action in a short time than during a program. In some cases, dark frames may be detected in the broadcasted media by channel monitoring server 1001, which separate between the program content to advertisement content being broadcasted. One or more of these or other methods for automatic detection of advertisements may be implemented by channel monitoring server 1001.

In other embodiments, monitoring broadcasted media for presence of advertisements may be manually performed by a human monitoring center. A human-activated monitoring center comprises persons who are continuously listening to and/or watching, either several predetermined channels or substantially all channels of any broadcasted media. These persons monitor such channels for presence of advertisements in real-time. As soon as an advertisement is detected by anyone of the persons performing monitoring, the person who detected an advertisement immediately inputs an alert or indication to the channel monitoring server 1001 indicating that advertisements are currently broadcasted by the specific channel the person is monitoring. The alert generated by the 'monitoring person' is then transmitted by the channel monitoring server 1001 to computerized devices of all users who are listening to or watching that channel, or have requested the system to monitor that channel, in order to cause a change of display in the computerized devices of these users that indicates the channel is currently broadcasting advertisements. Once the person monitoring that channel detects that advertisements are no longer broadcasted but rather that other content is now broadcasted, that monitoring person generates a new alert indicating that advertisements are no longer broadcasted by the channel. In some embodiments, neither advertisements nor a program is currently being broadcasted but rather content that is not part of the broadcasting schedule. In such a case a corresponding alert, e.g. a broadcast interruption indication may be generated by the monitoring person.

The new alert generated by the monitoring person is then transmitted from channel monitoring server 1001 to computerized devices of all users who are listening to or watching the channel, or have requested the system to monitor that channel, in order to inform these users that the channel is currently not broadcasting advertisements but is rather back on-air, i.e., broadcasting other content, e.g., a program. When advertisements are broadcasted once again, a new alert regarding presence of advertisements is generated by the monitoring person, channel monitoring server 1001 delivers the alert to relevant computerized devices of registered users, and causes a change of display on the users' computerized devices to indicate a change in the monitoring status of a channel. The human control center may perform monitoring of broadcasted media for presence of advertisements, 24 hours per day, seven days a week, in order to provide continuous and reliable monitoring.

In yet other embodiments, monitoring broadcasted media for presence of advertisements may be performed by 'social monitoring', which is advanced channel monitoring based on input received from users of the application for monitoring broadcasted media for presence of advertisements, e.g., application 1011. FIGS. 8-9, outline in a flowchart operations for performing 'social monitoring'.

Reference is now made to FIG. 8, which is a flowchart 800 of a method for optional 'social monitoring' of broadcasted media for presence of advertisements, according to exemplary embodiments of the disclosed subject matter. 'Social monitoring' is based on active and dynamic input sent by users of an application, e.g., application 1011 to a channel monitoring server, e.g., server 1001.

The channel monitoring server 1001 may include software instructions stored in a non-volatile storage unit, e.g., storage unit 1003 of FIG. 1A. The channel monitoring server 1001 may store a user profile for each registered user, and may assign each user a personal credibility score, such to define credibility of input received from each user.

The credibility score assigned to a user is high if the user's input is found valid, while the credibility score is low if the user's input is found invalid. Credibility score of a user may change dynamically in correlation with validity of new inputs sent by the user.

In operation 820, the channel monitoring server 1001 receives input from a user that an alert generated by the system is false. For example, in operation 820, either a plurality of users are sending their input to the channel monitoring server 1001 regarding a false alert generated by application 1011, or a user assigned with a high credibility score is sending his input regarding a false alert generated by application 1011. The input may be sent, for example, by a user pressing a specific button on the GUI display of application 1011, which may generate an error report from the user's computerized device and send the error report to the channel monitoring server 1001.

In operation 830, after channel monitoring server 1001 receives input regarding a false alert generated by the system (whether received from one highly credible user or from at least a plurality of users), the social monitoring system verifies validity of the received input. In some embodiments, validity of the input may be verified by manually determining presence or absence of advertisements currently broadcasting, or automatically determining whether or not advertisements were broadcasted at the time the channel monitoring server 1001 received the input from the user/s. For example, a person monitoring the channel for which the false alert input was received may recheck the current broadcasted content. In operation 840, the channel monitoring server 1001 determines validity of the input. If input is true, in operation 850, the channel monitoring server 1001 generates a new alert regarding presence or absence of advertisements and calculates a new user's credibility score that is higher than the previous. If the input true, the channel monitoring server 1001 generates a new alert indicating the correct status of the channel monitored by the user/s, and delivers the alert to the users' computerized apparatuses.

The channel monitoring server 1001 may further calculate an updated credibility score for one or more users who provided the error report, e.g., update the credibility score of the user/s, so that the score is higher with respect to the previous score, in order to provide a dynamic score that correlates with the error report provided by the user/s. If the error report is found false in operation 840, then in operation 860, the channel monitoring server 1001 ignores the users' input and calculates a new user's credibility score that is lower than the previous.

The credibility score for a user may be recalculated every time a new error report is received from the user. For example, the channel monitoring server 1001 may calculate the credibility score according to parameters such as the validity of error reports that the user provided, accumulated validity, the number of events that the user reported, etc. In one example, the following equation may be used:

$$(\text{sum of User input})/(\text{sum of user input events})*100 \qquad (i)$$

wherein, user error report is assigned the value 1, when the user's error report is determined to be true, and the user error report is assigned 0 when the user's error report is determined to be false.

For example, when a user provides a true input in a first error report sent to the channel monitoring server 1001, the user's credibility score is calculated according to equation (i) to be 100%. If the user repetitively provides a true input in three subsequent events, the user's credibility score remains 100%. However, if the user provides a false input at his fifth error report, his credibility score calculated by equation (i) would be lowered to 80%, since according to equation (i) 4/5*100=80%. If the user provides another false input at his sixth error report, his credibility score would be lowered to 66.66% (=4/6*100). If the user then sends a true input on his seventh error report, his credibility score would rise to 71.42% (=5/7*100), and so on.

Reference is now made to FIG. 9, which is a flowchart 900 of a method for 'social monitoring' of broadcasted media for presence of advertisements, according to exemplary embodiments of the disclosed subject matter.

In operation 910, the control system receives input from a user regarding presence or absence of advertisements broadcasted on a channel selected by the user, and which is not monitored by the channel monitoring server 1001. That is, a user may request monitoring for a channel that wasn't initially actively monitored by the channel monitoring server 1001.

In operation 920, the channel monitoring server 1001 determines the credibility score of the user, based on the user's previous inputs, and based on one or more parameters selected from: a validity of error reports that the user provided, accumulated number of valid reports, the number of events that the user reported, etc. In one example, the credibility score may be calculated according to equation (i).

In operation 930, the control system determines whether the user's credibility score is sufficiently high, e.g., above a predetermined threshold. For example, the threshold may be defined as a credibility score of 50% on a scale of 0-100%, though any other threshold may be predetermined in the channel monitoring server 1001.

If credibility score of the user is below the predetermined threshold, then in operation 940, the channel monitoring server 1001 ignores the user's error report.

If the credibility score is above the predetermined threshold, the control system determines in operation 950 whether input was received from more than one user. If no more than one user sent his input, in operation 960, the control system may generate an alert regarding presence or absence of advertisements. If more than one user sent their input, the control system determines in operation 970 whether or not the input is consistent from all users, e.g., if all users indicated advertisements are currently broadcasted or if all users indicated that advertisements are currently not broadcasted. If the error report input is consistent from all users, then in operation 960, the control system may generate an alert regarding presence or absence of advertisements. If the input is not consistent from all users, in operation 980, the channel monitoring server 1001 verifies validity of the user's input, e.g., as described with relation to operation 830 in FIG. 8.

Then, in operation 840, the control system determines validity of the error report. If input is true in operation 850, the channel monitoring server 1001 generates a new alert regarding presence or absence of advertisements and calculates a new user's credibility score that is higher than the previous. The channel monitoring server 1001 may update the credibility score of the user, so that the score is higher with respect to the previous score, in order to provide a dynamic score that correlates with each error report provided by the user. If the input is found false in operation 840, then in operation 860, the channel monitoring server 1001 ignores the user's input and calculates a new user's credibility score that is lower than the previous. The credibility score for a user may be recalculated every time a new error report is received from the user. The system may recalculate the credibility score according to equation (i)

In case the credibility score is below the predetermined threshold, then in operation 950, the channel monitoring server 1001 ignores the user's error report.

In some embodiments, when a plurality of users provide error reports to the channel monitoring server 1001, the channel monitoring server 1001 may determine whether or not to generate a new updated alert based on a calculation taking into consideration error reports received from all users with respect to the users' credibility score.

Different methods may be used to determine whether to change a current monitoring indication provided for a certain channel. For example, if a user indicates that an advertisement is currently broadcasting, the user's error report may be assigned with a first predetermined value, for example, '−1'. In case the user indicates that an advertisement is currently broadcasting, the user's error report may be assigned with a second predetermined value, for example, '+1'.

Different weighting algorithms may be applied in order to determine a sum score for changing a channel monitoring indication. For example, the input value assigned to the user's error report may be multiplied by the user's credibility score, in order to adjust the 'weight', i.e., significance of the error report according to the user's credibility score. The sum scores for all users who sent an error report for a specific channel, during a certain time period (e.g., during 10 minutes or less), may be used to determine whether to change a current monitoring indication. For example, the sum of the users' input indicating presence of advertisements along with their corresponding credibility, and the sum of user's input indicating absence of advertisements along with their credibility are compared.

If the comparison result is that the sum of the first predetermined values indicates that a substantially larger number of users provided error reports that indicated presence of advertisements, the channel monitoring server 1001 may generate an alert that the channel is currently broadcasting advertisements. However, if the comparison result is that the sum of the second predetermined values indicates that a substantially larger number of users provided error reports that indicated absence of advertisements, the channel monitoring server 1001 may generate an alert that the channel is currently not broadcasting advertisements. If the difference between the sums is not significant, the control system may send an alert to a human operator to manually determine on-line, presence or absence of advertisements by listening to or watching the channel selected by the users to be monitored.

There is thus provided according to the present disclosure, a method for detecting and monitoring advertisements in broadcasted media, comprising the steps of providing an application to a user for installation on a user's computerized apparatus, determining a channel of a broadcasted medium currently selected by the user, and monitoring the selected channel for presence of advertisements. The method may further comprise the steps of determining presence of at least one advertisement, generating, in real time, an alert to the user regarding the presence or absence of advertisements, based on the determined presence of at least one advertisement, and causing the application to display on the user's computerized apparatus a list of monitored channels along with indications regarding the presence or absence of advertisements in the listed channels, by the alert.

In some embodiments, the method may further comprise receiving an indication of the selected channel from the user.

In some embodiments, the step of determining the channel is performed automatically by a processing unit. In some embodiments, automatic channel determination is based according to a channel rating score. In some embodiments, the channel rating score is calculated based on historical data of a user. In other embodiments, the channel rating score is calculated based on data obtained from external databases of regional users of the broadcasted medium.

In some embodiments, monitoring the selected channel for presence of advertisements is continuous. In other embodiments, monitoring the selected channel for presence of advertisements comprises repeatedly monitoring the selected channel at least once in a predetermined time interval.

In some embodiments, the method is performed simultaneously on a plurality of channels.

In some embodiments, the application for detecting and monitoring advertisements in broadcasted media is configured to receive an error report from the user. According to some embodiments, the user is assigned with a credibility score based on validity of the user's error report.

There is thus further provided according to the present disclosure a system for detecting and monitoring advertisements in broadcasted media, the system comprising a processing unit and a display unit. The processing unit is configured to determine a channel of a broadcasted medium currently selected by a user, monitor the selected channel for presence of advertisements, determine presence of at least one advertisement, and generate, in real time, an alert to the user regarding the presence or absence of advertisements, based on the determined presence of at least one advertisement, the display unit is configured to provide the alert to the user in an auditory or visual manner.

In some embodiments, the processing unit is configured to determine the channel automatically. In other embodiments, the processing unit is configured to receive an indication of the selected channel from the user.

In some embodiments, the processing unit is configured to monitor a plurality of channels for presence of advertisements. In some embodiments, the display unit displays a list of the plurality of channels, wherein the order of display is arranged according to a channel rating score.

In some embodiments, the channel rating score is calculated based on historical data of a user. In other embodiments, the channel rating score is calculated based on data obtained from external databases of regional users of the broadcasted medium.

In the context of some embodiments of the present disclosure, by way of example and without limiting, a term such as 'operating' implies also capabilities, such as 'operable'.

Conjugated terms such as, by way of example, 'a thing property' implies a property of the thing, unless otherwise clearly evident from the context thereof.

The terms 'processor' or 'processing unit', or system thereof, are used herein as ordinary context of the art, such as a general purpose processor or a micro-processor, RISC processor, or DSP, possibly comprising additional elements such as memory or communication ports. Optionally or additionally, the terms 'processor' or 'processing unit' or derivatives thereof denote an apparatus that is capable of carrying out a provided or an incorporated program and/or is capable of controlling and/or accessing data storage apparatus and/or other apparatus such as input and output ports. The terms 'processor' or 'processing unit' denote also a plurality of processors connected, and/or linked and/or otherwise communicating, possibly sharing one or more other resources such as a memory.

The term 'configuring' for an objective, or a variation thereof, implies using at least a software and/or electronic circuit and/or auxiliary apparatus designed and/or implemented and/or operable or operative to achieve the objective.

A device storing and/or comprising an application and/or data constitutes an article of manufacture. Unless otherwise specified, the program and/or data are stored in or on a non-transitory medium.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for detecting and monitoring advertisements in broadcasted media, the method comprising the steps of:
provide an application to a user for installation on a user's computerized apparatus;
storing historical data per channel of a group of users, said historical data comprising historical channel selections by each user of the group of users;
calculating, per channel, a general rating score based on the stored historical data per channel;
determining a channel of a broadcasted medium currently selected by the user;
monitoring the selected channel for presence of advertisements;
determining presence of at least one advertisement in media broadcasted by the selected channel;
generating, in real time, a first alert to the user regarding the presence or absence of advertisements in media broadcasted by the selected channel, based on the determined presence of at least one advertisement, and the first alert causing the application to display on the user's computerized apparatus a list of monitored channels along with indications regarding the presence or absence of advertisements in each of said monitored channels, wherein the list of monitored channels is determined based on said general rating score;
generating, in real-time a second alert indicating that advertisements are no longer broadcasted by the selected channel;

transmitting the second alert indicating advertisements are no longer broadcasted by the selected channel, to the user's computerized apparatus;

displaying the second alert indicating advertisements are no longer broadcasted, by the selected channel, on the user's computerized apparatus; and receiving, by the application, an error report regarding the alert of the presence or absence of the advertisements from the user, the user is assigned with a credibility score based on validity of the user's error report.

2. The method according to claim 1, wherein determining the channel is performed automatically by a processing unit.

3. The method according to claim 2, wherein the channel rating score is calculated based on data obtained from rating related external databases.

4. The method according to claim 1, wherein said monitoring the channel for presence of advertisements is continuous.

5. The method according to claim 1, wherein said monitoring the selected channel for presence of advertisements comprises repeatedly monitoring the selected channel at least once in a predetermined time interval.

6. The method according to claim 1, wherein said method is performed simultaneously on a plurality of channels.

7. A system for detecting and monitoring advertisements in broadcasted media, comprising:

a processing unit configured to:

calculate, per channel, a general rating score based on historical data per channel, of a group of users, said historical data comprising historical channel selections, by each of the group of users;

determine a channel of broadcasted medium currently selected by a user;

monitor the selected channel for presence of advertisements;

determine presence of at least one advertisement in media broadcasted by the selected channel; and generate, in real time, a first alert to the user regarding the presence or absence of advertisements in media broadcasted by the selected channel, based on the determined presence of at least one advertisement;

generate, in real time a second alert indicating that advertisements are no longer broadcasted by the selected channel;

transmit the second alert indicating advertisements are no longer broadcasted by the selected channel, to the user's computerized apparatus; and receive an error report regarding the alert of the presence or absence of the advertisements from the user, the user is assigned with a credibility score based on validity of the user's error report;

a storage for storing the historical data of the group of users; and a display to provide the first alert and the second alert to the user in an auditory or visual manner, and to provide a list of monitored channels along with indications regarding the presence or absence of advertisements in each of said monitored channels, wherein the list of monitored channels is determined based on said general rating score.

8. The system according to claim 7, wherein the processing unit is configured to determine the channel automatically.

9. The system according to claim 7, wherein the processing unit is configured to monitor a plurality of channels for presence of advertisements, said plurality of channels determined by the processing unit based on said general rating score.

10. The system according to claim 9, wherein the display unit displays a list of said plurality of channels, wherein the order of display is arranged according to said general rating score.

11. The system according to claim 10, wherein the channel rating score is calculated based on data obtained from rating related external databases.

12. The system according to claim 7, wherein the processing unit is configured to calculate a general rating score based on the historical data of the users, per a certain time of day.

13. The system according to claim 12, wherein the general rating score is calculated based on the number of users watching or listening to a channel, such that a channel that the majority of users are watching or listening to at the same time of day is assigned with a high general rating score, and a channel that a small number of users is watching or listening to is assigned with a low general rating score.

14. The system according to claim 13, wherein the system automatically determines a list of channels assigned with a high general rating score as the channels that are to he monitored.

* * * * *